United States Patent [19]
Kurasako

[11] Patent Number: 5,544,724
[45] Date of Patent: Aug. 13, 1996

[54] HYDRAULIC BRAKE SYSTEM HAVING SERVO PRESSURE GENERATOR ACTIVATED BY MOVEMENT OF BRAKING DEVICE DUE TO TORQUE TRANSMITTED FROM ROTOR TO BRAKE PAD

[75] Inventor: Ryoichi Kurasako, Gotenba, Japan

[73] Assignee: Toyota Jidosha Kabushiki Kaisha, Aichi-ken, Japan

[21] Appl. No.: 331,702

[22] Filed: Oct. 31, 1994

[30] Foreign Application Priority Data

Nov. 4, 1993 [JP] Japan .................................. 5-275666
Dec. 29, 1993 [JP] Japan .................................. 5-355366

[51] Int. Cl.⁶ ............................ F16D 55/14; F16D 55/46
[52] U.S. Cl. ........................................................ 188/72.2
[58] Field of Search .............................. 188/346, 342, 188/72.2, 141, 344; 303/7

[56] References Cited

U.S. PATENT DOCUMENTS

| | | | |
|---|---|---|---|
| 5,024,298 | 6/1991 | Schenk et al. | 188/72.2 |
| 5,036,960 | 8/1991 | Schenk et al. | 188/346 |
| 5,168,966 | 12/1992 | Thioux et al. | 188/346 |
| 5,379,868 | 1/1995 | Kurasako | 188/72.2 |

FOREIGN PATENT DOCUMENTS

| | | |
|---|---|---|
| 57-30647 | 2/1982 | Japan . |
| 3-4041 | 1/1991 | Japan . |
| 4-337124 | 11/1992 | Japan . |
| 4-337125 | 11/1992 | Japan . |

*Primary Examiner*—Robert J. Oberleitner
*Assistant Examiner*—C. T. Bartz
*Attorney, Agent, or Firm*—Oliff & Berridge

[57] ABSTRACT

A hydraulically operated brake system having a servo pressure generating device activated by a torque transmitted from a disc rotor to a braking device with a brake cylinder during activation of the braking device by an operator-controlled master cylinder, to generate a servo pressure which is applied to the brake cylinder through a pressure control valve when the servo pressure is higher than the master cylinder pressure. The pressure control valve inhibits a flow of the fluid from the braking device toward the servo pressure generating device when the servo pressure is lower than the master cylinder pressure. A by-pass passage is provided for connecting the braking device and the servo pressure generating device while by-passing the pressure control valve, and a shut-off valve is provided in the by-pass passage. The shut-off valve is open when the master cylinder pressure is lower than a predetermined level, and closed when the master cylinder pressure exceeds the predetermined level.

20 Claims, 23 Drawing Sheets

HYDRAULIC BRAKE SYSTEM HAVING SERVO PRESSURE GENERATOR ACTIVATED BY MOVEMENT OF BRAKING DEVICE DUE TO TORQUE TRANSMITTED FROM ROTOR TO BRAKE PAD

BACKGROUND OF TEE INVENTION

1. Field of the Invention

The present invention relates in general to a hydraulically operated brake system, and more particularly to such brake system provided with a high-pressure source adapted to generate a pressure higher than a pressure generated by an operator-controlled pressure generating device such as a master cylinder. For instance, the high-pressure source may be a servo pressure generator to be activated by a torque which is transmitted from a disc rotor to a brake pad of a braking device during operation of the braking device by the pressure generated by the operator-controlled pressure generating device, so that the higher servo pressure is applied to the braking device.

2. Discussion of the Prior Art

A hydraulically operated brake system provided with such a servo pressure generating device is known according to JP-A-57-30647, which includes (a) an operator-controlled pressure generating device for generating a fluid pressure depending upon an operation of a brake operating member, (b) a braking device which has a brake pad, a pad support member supporting the brake pad, and a brake cylinder operated by a pressurized fluid to force the brake pad against a disc rotor, and which is attached to a stationary member near the disc rotor, (c) a servo pressure generating device activated by a torque transmitted to the pad support member from the disc rotor during operation of the brake cylinder, to generate a servo pressure, and (d) a pressure control valve having a first pressure chamber connected to the operator-controlled pressure generating device, a second pressure chamber connected to the braking device and a third pressure chamber connected to the servo pressure generating device. The pressure control valve operates to effect selective connection and disconnection of the first, second and third pressure chambers, for controlling the pressure in the second pressure chamber such that the pressure in the second pressure chamber is higher than and relating to the pressure in the first pressure chamber.

In this type of hydraulically braking system, a torque is transmitted to the pad support member from the disc rotor when the brake pad is forced against the rotor, and the servo pressure generating device is activated by the torque transmitted to the pad support member, whereby the servo pressure is generated by the servo pressure generating device.

When the torque exceeds a given value, the servo pressure becomes higher than the pressure generated by the operator-controlled pressure generating device such as a master cylinder. The pressure control valve is adapted to effect selective connection and disconnection of the operator-controlled pressure generating device, braking device and servo pressure generating device, so that the pressure in the braking device is controlled such that the pressure in the braking device is higher than and relating to the pressure in the operator-controlled pressure generating device.

When the vehicle is stopped with the brake operating member kept operated, the torque transmitted from the disc rotor to the pad-support member is lowered, or a reverse torque in the opposite direction is transmitted to the pad support member. In this case, the servo pressure generated by the servo pressure generating device is lowered, and may be lower than the atmospheric pressure.

When the vehicle is braked and stopped, a force acts on the vehicle body in a reverse direction opposite to the running direction, immediately after the vehicle is brought to a stop. During deceleration of the vehicle, an advancing movement of the vehicle is restricted, while the vehicle body tends to continue an advancing movement due to an inertia. As a result, elastic members such as those used in a suspension system connecting the wheels and the vehicle body undergo elastic deformation. When the inertia of the vehicle body is zeroed upon stopping of the vehicle, the elastic members which have elastically deformed are restored to their original states, causing the vehicle body to be moved relative to the stopped wheels in the direction opposite to the direction in which the vehicle has run. Consequently, the vehicle body is moved backward, causing a torque to act on the wheels in the reverse direction. This reverse torque is transmitted to the pad support member through the disc rotor, whereby the pressure in the servo pressure generating device is lowered.

When the vehicle is stopped on an uphill road surface, too, a torque acts on the wheel in the reverse direction, and a reverse torque is transmitted to the pad support member of the braking device.

If the servo pressure generated by the servo pressure generating device is reduced or lowered below the atmospheric pressure, the pressure in the braking device may be higher than the servo pressure. In this case, the brake fluid is fed into the servo pressure generating device. In the meantime, the pressure in the operator-controlled pressure generating device (in the first pressure chamber in the pressure control valve) is maintained at a relatively high level because the brake operating member is kept in an operated position to hold brake application to the stopped wheels. Accordingly, the pressure in the braking device (in the second pressure chamber of the pressure control valve) is made lower than the pressure in the operator-controlled pressure generating device (in the first pressure chamber), and the brake fluid is discharged from the operator-controlled pressure generating device, whereby the brake operating member is moved toward its fully operated position unexpectedly to the vehicle operator. That is, the operating stroke of the brake operating member is abruptly increased unexpectedly to the vehicle operator. This gives the vehicle operator an anxiety about the reliability of the brake system.

To avoid such drawback, the pressure control valve has not only a primary function of controlling the pressure in the second pressure chamber depending upon the pressure in the first pressure chamber, but also a secondary function of restricting the amount of increase in the operating stroke of the brake operating member due to a discharge flow of the fluid from the operator-controlled pressure generating device. Described more specifically, two shut-off valves are disposed in series between the second and third pressure chambers. One of these shut-off valve functions to control the pressure in the second pressure chamber, while the other shut-off valve is adapted to be closed to prevent a discharge flow of the brake fluid from the braking device toward the servo pressure generating device when the pressure in the third pressure chamber is lowered below a predetermined level.

However, the latter shut-off valve is closed only after the pressure in the second pressure chamber is lowered below the pressure in the first pressure chamber (in the operator-controlled pressure generating device) as a result of a discharge flow of the brake fluid from the braking device, which occurs due to a pressure reduction in the servo pressure generating device (in the third pressure chamber) upon stopping of the vehicle with the brake operating member kept operated. This arrangement is not capable of completely preventing an abrupt increase of the operating stroke of the brake operating member, and is not still satisfactory to relieve the vehicle operator from the anxiety about the operating reliability of the brake system.

The conventional brake system described above suffers from another problem. That is, the pressure control valve is normally placed in a first state for connection of the second pressure chamber to the first pressure chamber and disconnection of the second pressure chamber from the third pressure chamber, for controlling the pressure in the second pressure chamber to be equal to the pressure in the first pressure chamber. The pressure control valve is operated from the first state to a second state when the pressure in the first pressure chamber exceeds a predetermined level. In the second state, the second pressure chamber is disconnected from the first pressure chamber, and connected and disconnected to and from the third pressure chamber, for controlling the pressure in the second pressure chamber to be higher than and relating to the pressure in the first pressure chamber. The problem is encountered when the pressure control valve is operated from the first state to the second state.

Described in detail, when the pressure control valve is operated to the second state, the brake cylinder in the braking device is disconnected from the operator-controlled pressure generating device (such as a master cylinder operated by a brake pedal), and connected and disconnected to and from the servo pressure generating device (provided as a high-pressure source) for controlling the pressure in the brake cylinder to be higher than the pressure in the operator-controlled pressure generating device. As a result, the pressure in the wheel cylinder is suddenly increased, and the controllability of the braking force is deteriorated.

The deterioration of the braking force controllability is serious particularly where the pressure in the operator-controlled pressure generating device at which the pressure control valve is operated from the first state to the second state is comparatively low. Namely, when the depression force acting on the brake operating member is comparatively small, the vehicle operator does not expect an abrupt change in the braking force produced by the braking device, and an intricate control of the braking force is generally required.

If the braking force is suddenly increased upon transition of the pressure control valve from the first state to the second state during braking of the vehicle on a road surface having a relatively low coefficient of friction, the vehicle wheels tend to slip to a considerable extent.

SUMMARY OF THE INVENTION

It is therefore a first object of the present invention to provide a hydraulically operated brake system which is adapted to minimize or eliminate the conventionally experienced problem of an abrupt or sudden increase of the operating stroke of the brake operating member upon stopping of the vehicle with the brake operating member kept operated.

It is a second object of the present invention to provide a hydraulically operated brake system which is adapted to adapted to minimize the deterioration of the braking force controllability when the pressure control valve is operated from the first state to the second state.

The first object indicated above may be achieved according to a first aspect of this invention, which provides a hydraulically operated brake system comprising: (a) an operator-controlled brake operating member; (b) an operator-controlled pressure generating device for generating a pressure of a brake fluid depending upon an operation of the brake operating member; (c) a braking device having a brake pad, a pad support member supporting the brake pad, and a brake cylinder operated by a pressure of the brake fluid to force the brake pad against a disc rotor, the braking device being attached to a stationary member near the disc rotor, rotatably in a rotating direction of the disc rotor; (d) a servo pressure generating device activated by a torque transmitted to the pad support member from the disc rotor during operation of the brake cylinder, to generate a servo pressure of the brake fluid; (e) a pressure control valve having a first pressure chamber connected to the operator-controlled pressure generating device, a second pressure chamber connected to the braking device and a third pressure chamber connected to the servo pressure generating device, the pressure control valve operating to effect selective connection and disconnection of the first, second and third pressure chambers, for controlling a pressure of the brake fluid in the second pressure chamber such that the pressure in the second pressure chamber is higher than and relating to the pressure in the first pressure chamber, the pressure control valve inhibiting a flow of the brake fluid from the braking device toward the servo pressure generating device when the pressure in the servo pressure generating device is lower than the pressure in the braking device; (f) a first by-pass passage for connecting the braking device and the servo pressure generating device while by-passing the pressure control valve; and (g), a shut-off valve provided in the first by-pass passage, the shut-off valve being open when the pressure in the operator-controlled pressure generating device is lower than a predetermined level, and closed when the pressure in the operator-controlled pressure generating device is higher than the predetermined level.

The pad support member of the braking device is a member which receives a torque transmitted from the disc rotor through the brake pad upon activation of the braking device by the pressure generated by the operator-controlled pressure generating device. Where the braking device uses an opposed-cylinder type caliper in which brake cylinders are disposed on the opposite sides of the disc rotor, the brake pads are generally supported by the caliper. In this case, the caliper serves as the pad support member. Where the braking device uses a floating type caliper which is supported by a mounting bracket movably in the axial direction of the disc rotor, a brake cylinder is disposed on only one side of the disc rotor, and the brake pad is supported by the mounting bracket. In this case, the mounting bracket serves as the pad support member.

In the brake system of the present invention constructed as described above, the shut-off valve is closed before the vehicle is stopped with the brake operating member kept operated, because the pressure in the operator-controlled pressure generating device is higher than the predetermined level. That is, the predetermined level is so determined. Since the shut-off valve is provided in the by-pass passage connecting the braking device and the servo pressure generating device, the pressure in the braking device can be controlled by the pressure control device, independently of whether the shut-off valve is open or closed. Therefore, the shut-off valve can be brought to the closed state to cut or close the by-pass passage before the vehicle is stopped with the brake operating member kept operated.

The present brake system is capable of preventing the brake fluid from flowing from the braking device toward the servo pressure generating device through the by-pass passage, since the by-pass passage is cut or closed by the closed shut-off valve, even when the pressure in the servo pressure generating device is lowered or is lower than the atmospheric pressure due to reduction or reversal of the torque transmitted to the pad support member upon stopping of the vehicle with the brake operating member kept operated as described above.

On the other hand, the pressure control valve operates to maintain the pressure in the braking device at a constant level, with the braking device disconnected from the servo pressure generating device, as long as the depression force acting on the brake operating member is held constant. Therefore, the brake fluid will not flow from the braking device toward the servo pressure generating device through the pressure control valve.

When the depression force on the brake operating member is reduced or zeroed to re-start the vehicle, the servo pressure in the servo pressure generating device is lowered/ As a result, the shut-off valve is opened, and the brake fluid is fed from the braking device to the servo pressure generating device through the by-pass passage and the open shut-off valve, or from the operator-controlled pressure generating device to the servo pressure generating device through the pressure control valve, by-pass passage and open shut-off valve. Accordingly, the servo pressure generating device can be filled with a sufficient amount of brake fluid before the brake operating member is further depressed or operated again.

As described above, the present brake system is adapted to prevent a flow of the brake fluid from the braking device toward the servo pressure generating device through the by-pass passage even when the vehicle is stopped with the brake operating member kept depressed. The brake system is also adapted to prevent a flow of the brake fluid from the braking device toward the servo pressure generating device through the pressure control valve, as long as the depressing force acting on the brake operating member is held constant. Thus, the brake operating member does not undergo an unexpected an abrupt increase in its operating stroke during a vehicle stop with brake applied thereto, provided the depression force on the brake operating member is constant. Further, the present brake system assures a sufficient braking force while the vehicle is stopped, since the pressure in the braking device will not be lowered when the vehicle is stopped with the brake operating member kept operated.

The shut-off valve may be a pilot-operated shut-off valve which receives as a pilot pressure the pressure in the operator-controlled pressure generating device, or the pressure in the braking device.

According to a first preferred form of this invention, the brake system further comprises a servo pressure passage connecting the servo pressure generating device and the third pressure chamber of the pressure control valve, and a servo pressure passage check valve provided in the servo pressure passage. The servo pressure passage check valve permits a flow of the brake fluid from the servo pressure generating device toward the third pressure chamber, and inhibits a flow of the brake fluid from the third pressure chamber toward the servo pressure generating device.

In the above form of the invention, the servo pressure passage check valve inhibits a flow of the brake fluid from the third pressure chamber of the pressure control valve toward the servo pressure generating device when the pressure is the servo pressure generating device is lower than the pressure in the third pressure chamber. For example, the check valve inhibits a flow of the fluid into the servo pressure generating device, and thereby prevents a sudden increase in the operating stroke of the brake operating member, even when the pressure control valve is placed in the state for connection of the second and third pressure chambers as a result of an increase in the depression force on the brake operating member while the vehicle is stopped.

On the other hand, the servo pressure generated by the servo pressure generating device is applied to the third pressure chamber through the servo pressure passage check valve, with a result of an increase in the pressure in the third pressure chamber. Therefore, when the pressure control valve is placed in the state for communication of the second and third pressure chambers, the pressure in the second pressure chamber rises to increase the pressure in the braking device.

According to a second preferred form of the invention, the brake system further comprises a reservoir, a reservoir passage connecting the reservoir and the servo pressure generating device, and a reservoir passage check valve which is provided in the reservoir passage and which permits a flow of the brake fluid from the reservoir toward the servo pressure generating device, but inhibits a flow of the brake fluid from the servo pressure generating device toward the reservoir.

In the above form of the invention, the brake fluid is fed from the reservoir to the servo pressure generating device through the reservoir passage check valve when the pressure in the servo pressure generating device is lower than the pressure in the reservoir (which is generally equal to the atmospheric pressure, but not limited thereto). Thus, the servo pressure generating device may be filled with the brake fluid delivered from the reservoir, which serves as a fluid source other than the braking device and operator-controlled pressure generating device. In other words, the brake fluid need not be supplied to the servo pressure generating device from the braking device or operator-controlled pressure generating device. This makes it easier to deal with the conventional problem of the abrupt increase of the brake operating member upon vehicle stopping with the brake operating member kept operated. Further, the servo pressure generating device may be easily filled with the brake fluid, and protected from vibration or rattling which would otherwise occur upon operating of a shift lever from a forward drive position to a rear drive position while the vehicle is stopped with the brake operating member kept in an operated position, as described in detail in the following description of the preferred embodiments of this invention.

The second object indicated above as well as the first object may be achieved according to a third preferred form of the present invention, wherein the pressure control valve is normally placed in a first state for connection of the second pressure chamber to the first pressure chamber and for disconnection of the second pressure chamber from the third pressure chamber, for controlling the pressure in the second pressure chamber to be equal to the pressure in the first pressure chamber. The pressure control valve is brought to a second state for disconnection of the second pressure chamber from the first pressure chamber and for connection and disconnection of the second pressure chamber to and from the third pressure chamber, for controlling the pressure in the second pressure chamber to be higher than and relating to the pressure in the first pressure chamber, when the pressure in the first pressure chamber exceeds a predetermined level. In the present form of the invention, the brake system further comprises pressure-rise restricting means for restricting an abrupt rise of the pressure in the second pressure chamber when the pressure control valve is operated from the first state to the second state.

In the above preferred form of the invention, the pressure-rise restricting means functions to restrict, limit or minimize the amount of an abrupt pressure increase in the second pressure chamber of the pressure control valve when the valve is operated from the first state to the second state for applying the servo pressure to the braking device. The pressure-rise restricting means may be adapted to restrict an abrupt pressure rise in the first pressure chamber to thereby restrict an abrupt pressure rise in the second pressure chamber when the pressure control valve is operated to the second state. Since the pressure in the second pressure chamber is controlled depending upon the pressure in the first pressure chamber, the abrupt rise of the pressure in the second pressure chamber can be restricted by restricting the pressure rise in the first pressure chamber. Alternatively, the pressure-rise restricting means may be adapted to restrict the rate of rise of the pressure in the second pressure chamber.

In either case, the pressure-rise restricting means is effective to restrict or minimize a sudden increase of the pressure in the brake cylinder of the braking device, and improve the controllability of the braking force, upon transition of the pressure control valve from the first state to the second state. The pressure-rise restricting means permits an intricate control of the braking force while the vehicle is braked for a relatively small degree of deceleration or during running on a road surface having a comparatively low friction coefficient.

According to one advantageous arrangement of the above third preferred form of the invention, the pressure-rise restricting means comprises an accumulator which is connected to a primary fluid passage connecting the operator-controlled pressure generating device and the braking device. The accumulator accommodates the brake fluid under pressure such that the pressure in the accumulator increases with an increase of an amount of the brake fluid accommodated in the accumulator. The accumulator has not only a function of restricting the amount of pressure rise in the braking device upon transition of the pressure control valve to the second state, but also a function of reducing the rate of pressure rise in the operator-controlled pressure generating device after the pressure control valve starts controlling the pressure in the braking device. This arrangement facilitates a pressure control of the operator-controlled pressure generating device.

According to one desirable feature of the above advantageous arrangement, the accumulator comprises: a housing; a piston disposed in the housing and cooperating with the housing to define a fluid absorbing chamber for accommodating the brake fluid; a spring biasing the piston in a direction of reducing a volume of the fluid absorbing chamber; and a set load adjusting device for adjusting a set load of the spring. According to this feature, the pressure level at which the accumulator starts accommodating or absorbing the brake fluid can be adjusted by changing the set load or initial biasing force of the spring by operating the set load adjusting device. For efficiently restricting the pressure rise in the braking device, it is desirable that the accumulator begins accommodating the brake fluid as soon as the pressure control valve has been brought to the second state. This optional requirement is satisfied according to the present feature.

According to another desirable feature of the above arrangement, the accumulator comprises: a housing; a piston disposed in the housing and cooperating with the housing to define a fluid absorbing chamber for accommodating the brake fluid; and a spring biasing the piston in a direction of reducing a volume of the fluid absorbing chamber. The piston of the accumulator is associated with a valve of the shut-off valve such that the piston of the accumulator acts on the valve of the shut-off valve so as to close the shut-off valve when the piston of the accumulator is moved in the direction of reducing the volume of the fluid absorbing chamber. In this case, the accumulator also functions to open and close the shut-off valve. In other words, a pilot pressure chamber of the shut-off valve which receives a pilot pressure acting on the piston is utilized as the accumulator.

According to a fourth preferred form of this invention, the pressure control valve comprises a housing, and a control piston disposed in the housing and cooperating with the housing to define the first, second and third pressure chambers. The control piston engages the housing such that a clearance therebetween is small enough to provide fluid tightness therebetween without a sealing member interposed therebetween. In this case, the pressure control valve has a comparatively small hysteresis in controlling the braking pressure.

According to a fifth preferred form of the invention, the shut-off valve comprises a housing, and a drive piston which is axially movably received in the housing and which receives as a pilot pressure the pressure in the operator-controlled pressure generating device so as to open and close the shut-off valve. The drive piston engages the housing such that a clearance therebetween is small enough to provide fluid tightness therebetween without a sealing member interposed therebetween. In this case, the shut-off valve can be opened at a relatively low pressure.

According to a sixth preferred form of the invention, the brake system further comprises a first by-pass passage check valve provided in the first by-pass passage in series with the shut-off valve. The first by-pass passage check valve permits a flow of the brake fluid from the braking device toward the servo pressure generating device, and inhibits a flow of the brake fluid from the servo pressure generating device toward the braking device. In this form of the invention, it is possible to prevent a flow of the brake fluid from the servo pressure generating device toward the braking device through the first by-pass passage even when the servo pressure is generated by the servo pressure generating device before the shut-off valve is closed.

According to a seventh preferred form of the invention, the brake system further comprises a second by-pass passage and a second by-pass passage check valve provided in the second by-pass passage. The second by-pass passage is connected to a primary fluid passage while by-passing the pressure control valve. The primary fluid passage connects the operator-controlled pressure generating device and the braking device through the pressure control valve. The second by-pass passage check valve permits a flow of the brake fluid from the operator-controlled pressure generating device toward the braking device, and inhibits a flow of the brake fluid from the braking device toward the operator-controlled pressure generating device. In this form of the invention, the braking device is supplied with the brake fluid through the second by-pass passage as well as the pressure control valve. Accordingly, the braking device provides a braking effect with improved response to an operation of the brake operating member.

According to an eighth preferred form of the present invention, the braking device comprises two links which have a first pair of pivot axes lying on a first circle concentric with the disc rotor, and a second pair of pivot axes lying on a second circle which is concentric with the first circle and which has a larger diameter than the first circle. The two links cooperate with the pad support member and the stationary member to constitute a four-link mechanism, so that the pad support member is supported by the four-link mechanism such that the pad support member is rotatable substantially about an axis of rotation of the disc rotor.

According to a ninth preferred form of the invention, the servo pressure generating device comprises: a servo cylinder; a servo piston slidably and fluid-tightly engaging the servo cylinder and cooperating with the servo cylinder to define a servo pressure generating chamber; and a drive member connected to the servo cylinder such that the drive member is movable relative to the servo cylinder in an axial direction of the servo cylinder. The drive member acts on the servo piston to cause a relative movement of the servo cylinder and the servo piston for thereby generating the servo pressure in the servo pressure generating chamber. One of the drive member and the servo cylinder is fixed to the stationary member, and the other of the drive member and the servo cylinder is connected to the braking device.

According to a tenth preferred form of the invention, the pressure control valve comprises: a control piston having a first pressure-receiving surface receiving the pressure in the first pressure chamber, and a second pressure-receiving surface having a smaller area than said first p-r surface and receiving the pressure in the second pressure chamber; biasing means for biasing the control piston toward the first pressure chamber; and a directional control valve having a first state and a second state. The directional control valve is normally placed in the first state, and brought to the second state when the control piston is moved toward the second pressure chamber against a biasing force of the biasing means. In the first state, the second pressure chamber is connected to the first pressure chamber and disconnected from the third pressure chamber. In the second state, the second pressure chamber is disconnected from the first pressure chamber and connected to the third pressure chamber when the directional control valve is placed in the second state.

The first object may also be achieved according to a second aspect of this invention, which provides a hydraulically operated brake system comprising: (a) an operator-controlled brake operating member; (b) an operator-controlled pressure generating device for generating a pressure of a brake fluid depending upon an operation of the brake operating member; (c) a braking device having a brake pad, a pad support member supporting the brake pad, and a brake cylinder operated by a pressure of the brake fluid to force the brake pad against a disc rotor, the braking device being attached to a stationary member near the disc rotor, rotatably in a rotating direction of the disc rotor; (d) a servo pressure generating device activated by a torque transmitted to the pad support member from the disc rotor during operation of the brake cylinder, to generate a servo pressure of the brake fluid; (e) a pressure control valve having a first pressure chamber connected to the operator-controlled pressure generating device, a second pressure chamber connected to the braking device and a third pressure chamber connected to the servo pressure generating device, the pressure control valve operating to effect selective connection and disconnection of the first, second and third pressure chambers, for controlling a pressure of the brake fluid in the second pressure chamber such that the pressure in the second pressure chamber is higher than and relating to the pressure in the first pressure chamber, the pressure control valve inhibiting a flow of the brake fluid from the braking device toward the servo pressure generating device when the pressure in the servo pressure generating device is lower than the pressure in the braking device; (f) a servo pressure passage connecting the servo pressure generating device and the third pressure chamber of the pressure control valve; (g) a servo pressure passage check valve provided in the servo pressure passage, the servo pressure passage check valve permitting a flow of the brake fluid from the servo pressure generating device toward the third pressure chamber, and inhibiting a flow of the brake fluid from the third pressure chamber toward the servo pressure generating device; (h) a reservoir; (i) a reservoir passage connecting the reservoir and the servo pressure generating device; and (j) a reservoir passage check valve provided in the reservoir passage, the reservoir passage check valve permitting a flow of the brake fluid from the reservoir toward the servo pressure generating device, and inhibiting a flow of the brake fluid from the servo pressure generating device toward the reservoir.

The brake system constructed according to the second aspect of this invention described above is also capable of preventing an abrupt increase of the operating stroke of the brake operating member or an unexpected movement of the brake operating member toward its fully operated position, upon stopping of the vehicle with the brake operating member kept operated. However, the present brake system does not require the first by-pass passage and shut-off valve as provided in the brake system according to the first aspect of the present invention.

The second object indicated above may be achieved according to a third aspect of the present invention, which provides a hydraulically operated brake system comprising: (a) an operator-controlled brake operating member; (b) an operator-controlled pressure generating device for generating a pressure of a brake fluid depending upon an operation of the brake operating member; (c) a wheel brake cylinder for braking the disc rotor; (d) a high-pressure source for applying to the wheel brake cylinder a pressure higher than the pressure generated by the operator-controlled pressure generating device; (e) a pressure control valve having a first pressure chamber connected to the operator-controlled pressure generating device, a second pressure chamber connected to the braking device and a third pressure chamber connected to the servo pressure generating device, the pressure control valve being normally placed in a first state for connection of the second pressure chamber to the first pressure chamber and for disconnection of the second pressure chamber from the third pressure chamber, for controlling the pressure in the second pressure chamber to be equal to the pressure in the first pressure chamber, the pressure control valve being brought to a second state for disconnection of the second pressure chamber from the first pressure chamber and for connection and disconnection of the second pressure chamber to and from the third pressure chamber, for controlling the pressure in the second pressure chamber to be higher than and relating to the pressure in the first pressure chamber, when the pressure in the first pressure chamber exceeds a predetermined level; and (f) pressure-rise restricting means for restricting an abrupt rise of the pressure in the second pressure chamber when the pressure control valve is operated from the first state to the second state.

The brake system according to the third aspect of the invention provides substantially the same advantages as described with respect to the third preferred form of the invention according to the first aspect. Briefly, the present brake system is adapted to restrict or minimize a sudden pressure rise in the braking device when the pressure control valve is operated to the second state for controlling the pressure in the braking device such that the pressure in the braking device is higher than and proportional to the pressure generated by the operator-controlled pressure generating device.

BRIEF DESCRIPTION OF THE DRAWINGS

The above and other objects, features and advantages of the invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
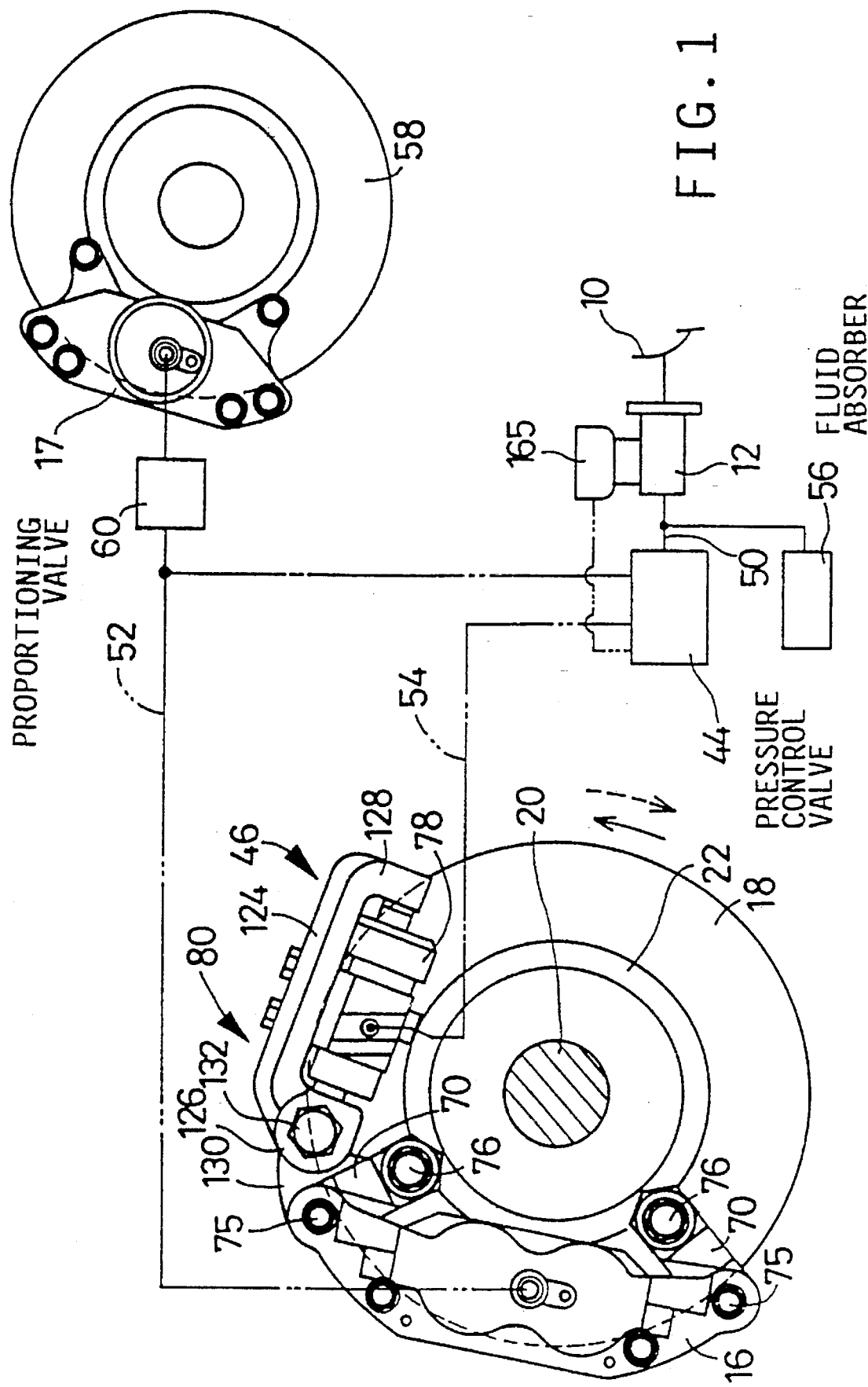
FIG. 1 is a schematic view showing a hydraulically operated brake system constructed according to one embodiment of the present invention.

Referring first to FIG. 1, the hydraulically operated brake system has a brake operating member in the form of a brake pedal 10, a pressure generating device in the form of a master cylinder 12 adapted to generate an operator-desired brake pressure, and two front brake calipers 16 and two rear brake calipers 17 which are provided with wheel brake cylinders for applying brake to a front and rear wheels of a motor vehicle, respectively.

The two front calipers 16 (one of which is shown in FIG. 1) for the two front wheels have the same construction. These front calipers 16 will be first described by reference to FIGS. 7 and 8.

Each front caliper 16 is provided for a front wheel disc rotor 18, which is fixed by bolts to an axle hub 19 of the vehicle. A spindle 20 is formed as an integral part of the axle hub 19 such that the spindle 20 extends from a central portion of the hub 19. The spindle 20 is supported by a steering knuckle 22 such that the spindle 20 is rotatable relative to the knuckle 22. Thus, the rotor 18 is rotatable about an axis L relative to the steering knuckle 22, together with the spindle 20 and axle hub 1.

The front caliper 16, which is disposed so as to straddle over the disc rotor 18, is an opposed-cylinder type in which two pairs of wheel brake cylinders 24, 26 are opposed to each other, with the outer portion of the rotor 18 being interposed therebetween. In each wheel brake cylinder 24, 26, there is fluid-tightly and slidably received a piston 28, 30. An inner pad 32 is disposed between the rotor 18 and the two pistons 28, while an outer pad 34 is disposed between the rotor 18 and the two pistons 39. Each of the inner and outer pads 32, 34 is backed by a backing plate 36, 38, and is supported at the backing plate 36, 38 by the body of the caliper 16 such that the pad 32, 34 is movable in the axial direction of the rotor 18. Pad pins are fixed to the body of the caliper 16 and are inserted into the inner and outer pads 32, 34, to prevent movements of the pads 32, 34 in the radial direction of the rotor 18.

Each wheel brake cylinder 24, 26 of the caliper 16 has a pressure chamber 41, 42, which is connected via a pressure control device 44 to the master cylinder 12 by fluid passages 50, 52 and to a servo pressure generating chamber 48 of a servo pressure generating device 46 by fluid passages 52, 54, as indicated in FIG. 1. The fluid passages 50, 52 constitute a primary fluid passage connecting the master cylinder 12 and the caliper 16. With a pressurized brake fluid fed into each pressure chamber 41, 42 of the wheel brake cylinders 24, 26, the pistons 28, 30 are advanced toward the rotor 18, whereby the inner and outer pads 32, 34 are forced against the opposite surfaces of the rotor 18.

To the fluid passage 50 which connects the master cylinder 12 and the pressure control device 44, there is connected pressure rise restricting means in the form of an accumulator or fluid absorber 56, which is adapted to restrict or limit a pressure rise in the pressure chambers 41, 42.

The two rear calipers 17 (one of which is shown in FIG. 1) for the two rear wheels of the vehicle have the same constructions. Each rear caliper 17 is disposed so as to straddle over a disc rotor 58, which is rotated with the corresponding rear wheel, and has almost the same construction as the front calipers 16. However, the rear caliper 17 has only one pair of wheel brake cylinders and corresponding two pressure chambers. These wheel brake cylinders are connected via a proportioning valve 60 to the fluid passage 52, and are provided with either the pressure in the master cylinder 12 or a pressure which is obtained by lowering the pressure in the servo pressure generating device 46. Since the wheel brake cylinders of the rear caliper 17 are connected to the servo pressure generating device 46, the rear caliper 17 need not be provided with an exclusive servo pressure generating device.

Figure 7:
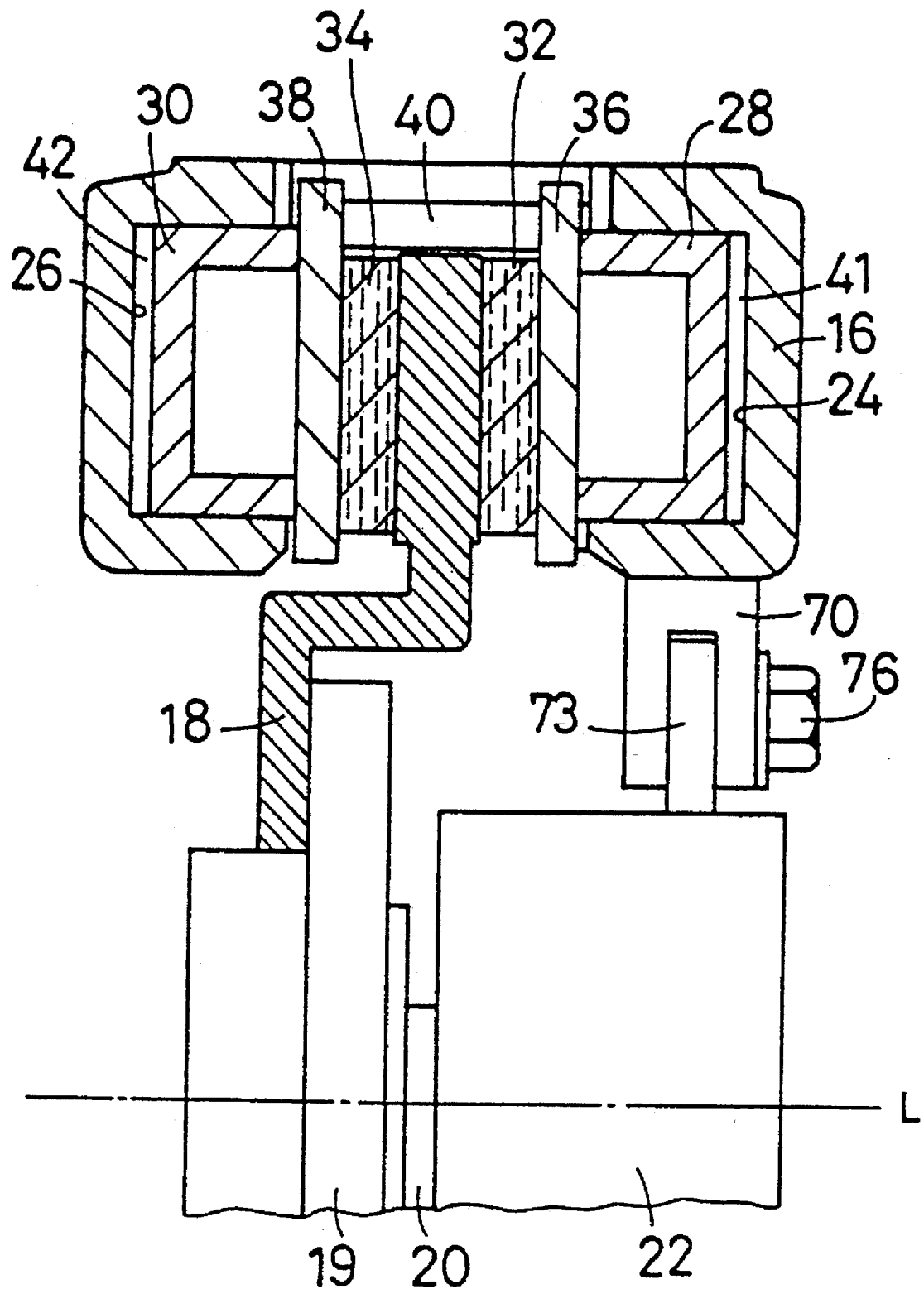
FIG. 7 is a front elevational view in cross section of a disk brake used in the brake system of FIG. 1.
Figure 8:
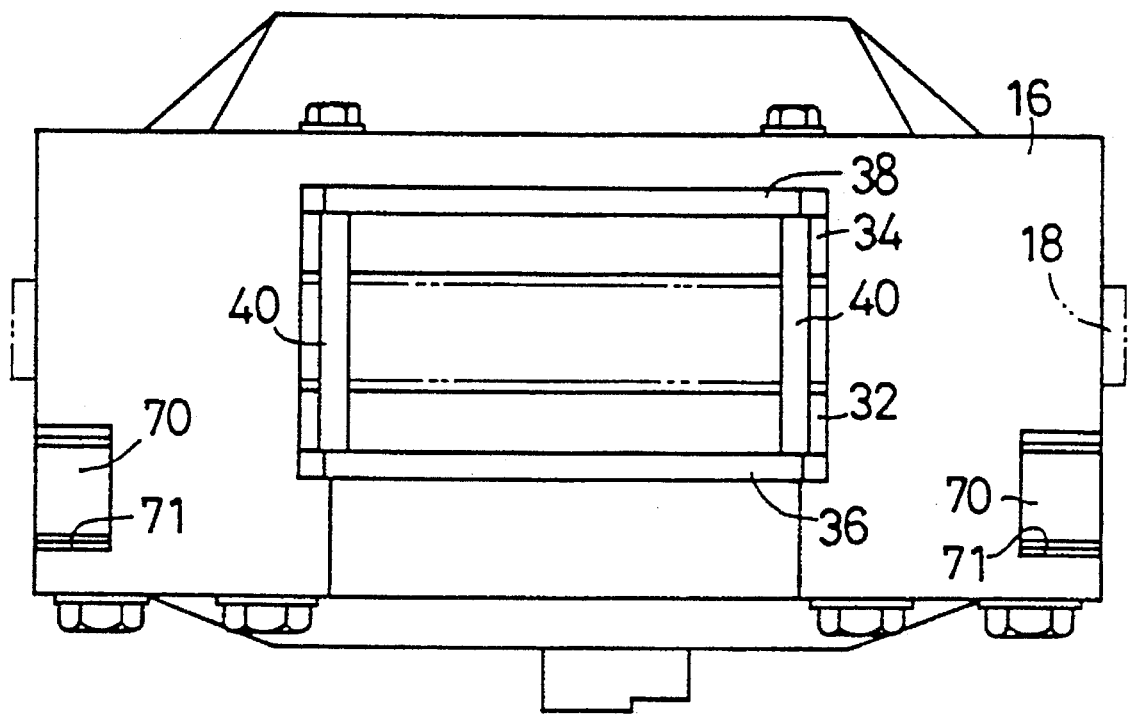
FIG. 8 is a plan view of the disk brake of FIG. 7.

As shown in FIG. 1, the caliper 16 is linked with the steering knuckle 22 by two links 70, and has two cutouts 71 as shown in FIG. 8. The cutouts 71 are formed to extend in the radial direction of the rotor 18, at two positions of the caliper 16 which are offset from the axis L (FIG. 7) of the rotor 18 and which are spaced apart from each other in the circumferential direction of the rotor 18. On the other hand, the steering knuckle 22 has two projections 73, one of which is shown in FIG. 7. The projections 73 are formed to extend in the radially outward direction of the rotor 18, at two positions of the knuckle 22 which are offset from the axis L and are spaced apart from each other in the circumferential direction of the rotor 18.

The two links 70 are inserted at one end thereof into the respective cutouts 71, and are connected by respective pins 75 to the caliper 16 pivotally about an axis of the corresponding pin 75, which is parallel to the axis L. Each link 70 has a york at the other end, as shown in FIG. 7, at which the link 70 is connected by a pin 76 to the projection 73 pivotally about an axis of the pin 76, which is also parallel to the axis L. The projection 73, which extends from the steering knuckle 22, is inserted between the two opposed portions of the york. The two pins 76 connecting the two links 70 to the steering knuckle 22 are positioned on a circular arc which has a center on the axis L. Similarly, the two pins 75 connecting the links 70 to the caliper 16 are positioned on another circular arc which has a center on the axis L and which has a larger radius than the circular arc described above with respect to the pins 76. Thus, the caliper 16 is linked with the steering knuckle 22 by the two links 70, two pins 75 and two pins 76, movably substantially in the circumferential direction of the rotor 18.

Unlike the front calipers 16, the rear calipers 17 are secured to a stationary member of the vehicle such that movements of the rear calipers 17 in the circumferential direction of the rotor 58 are prevented.

Figure 2:
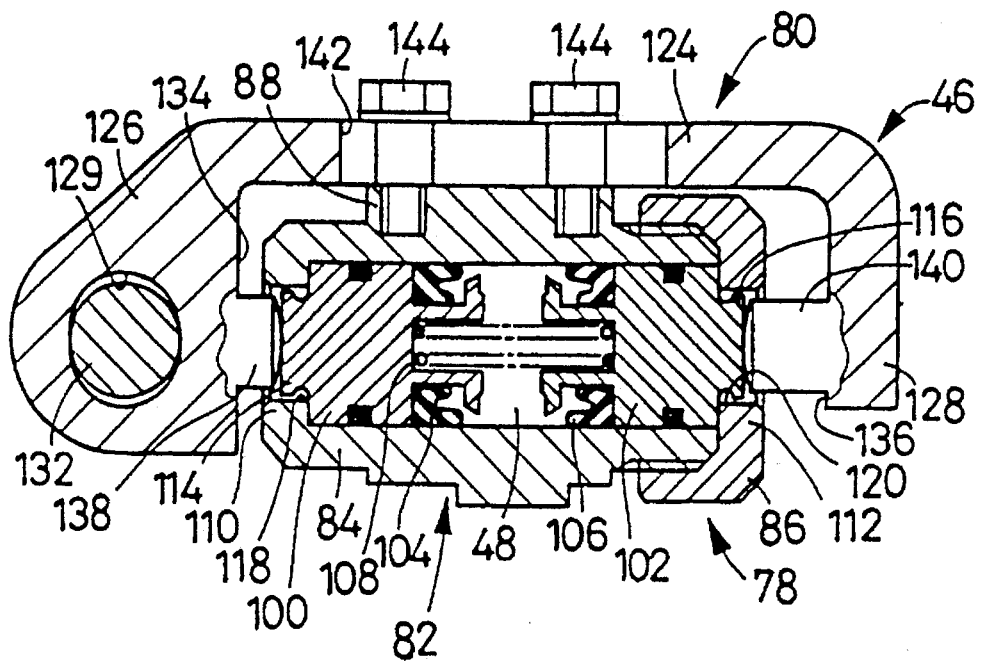
FIG. 2 is a front elevational view in cross section of a servo pressure generating device used in the brake system of FIG. 1.
Figure 3:
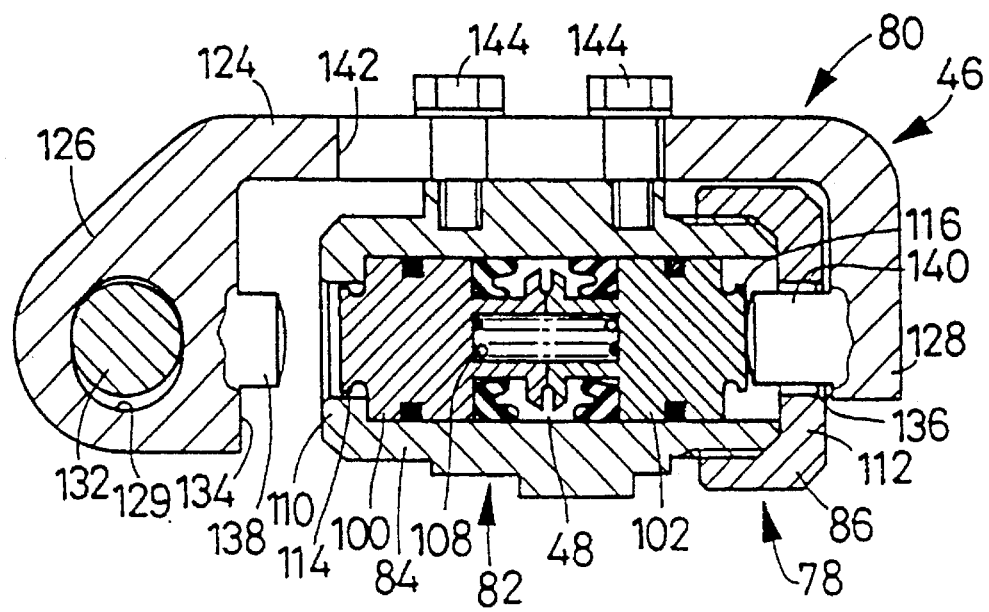
FIG. 3 is a front elevational view in cross section of the servo pressure generating device placed in an operating position different from that of FIG. 2.
Figure 4:
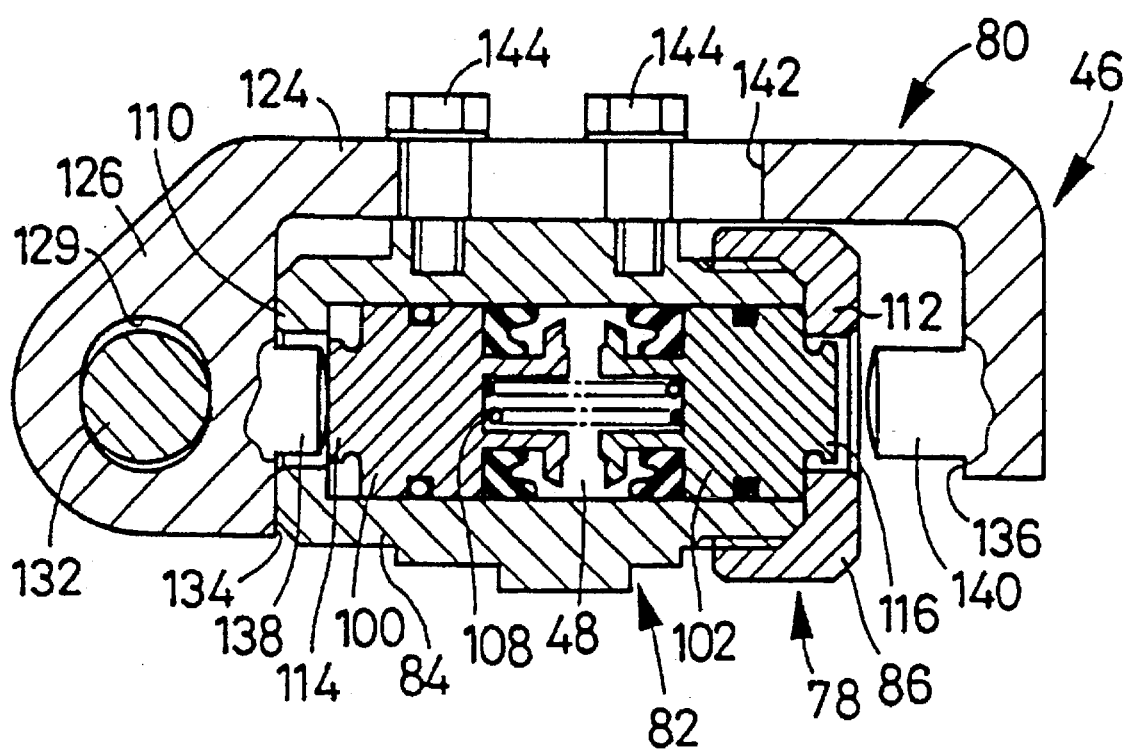
FIG. 4 is a front elevational view in cross section of the servo pressure generating device placed in another operating position different from those of FIGS. 2 and 3.
Figure 5:
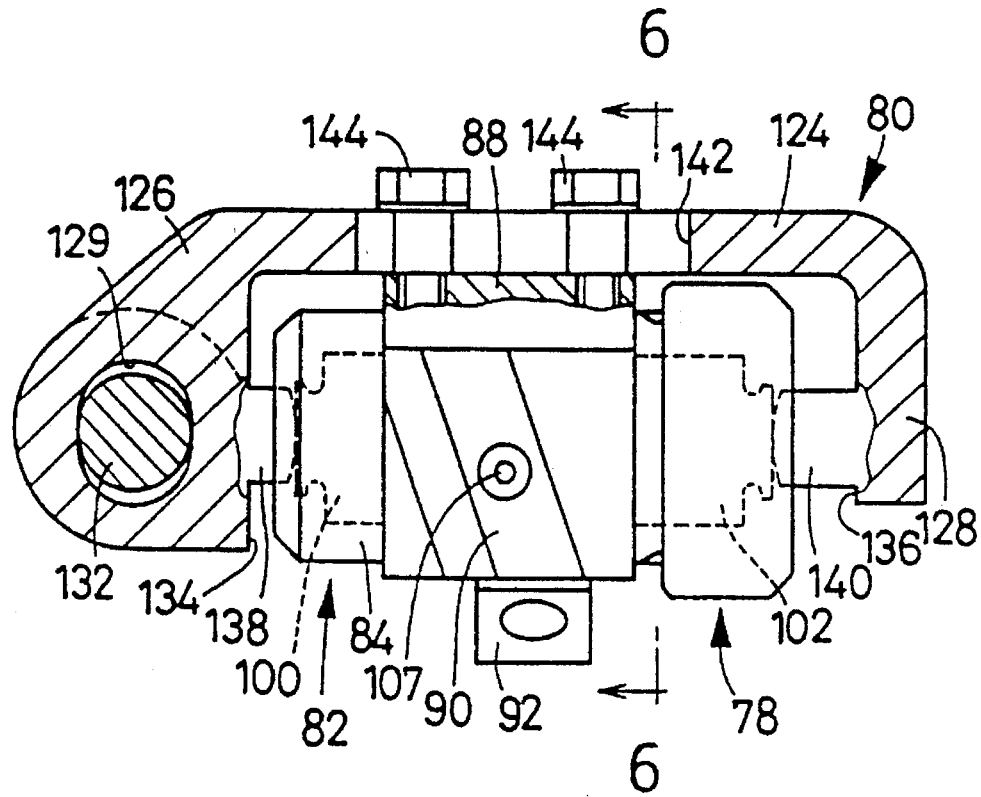
FIG. 5 is an elevational view showing in cross section a cylinder drive member of the servo pressure generating device of FIG. 2.
Figure 6:
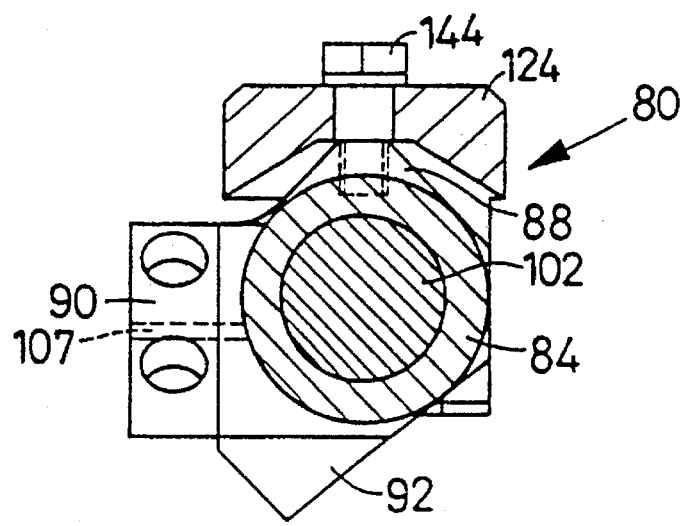
FIG. 6 is a cross sectional view taken along line 6—6 of FIG. 5.

Referring next to FIGS. 2–6, the servo pressure generating device 46 will be described. The device 46 includes a servo cylinder 78, and a servo cylinder drive member 80. The servo cylinder 78 has a cylinder housing 82, which has a cylindrical member 84, and a cap 86 threaded on one longitudinal end portion of the cylindrical member 84, as shown in FIG. 2. As shown in FIGS. 5 and 6, the cylindrical member 84 has, at a longitudinally middle portion, a projection 88 extending in the radially outward direction of the rotor 18, a first attaching portion 90 extending in the axial direction of the rotor 18, and a second attaching portion 92 extending in the radially inward direction of the rotor 18. The cylinder housing 82 is secured at the attaching portions 90, 92 to a portion of the steering knuckle 22, such that the cylinder housing 82 generally extends in a direction tangent to a circle whose center lies on the axis L of the rotor 18.

Within the cylindrical member 84, there are slidably received a first and a second piston 100, 102, in a fluid-tight manner by cup seals 104, 106, respectively. The first and second pistons 100, 102 cooperate to define the servo pressure generating chamber 48 indicated above. This chamber 48 is connected to the pressure control device 44, through a port 107 formed through the first attaching portion 90, as shown in FIGS. 5 and 6.

The first and second pistons 100, 102 are biased in opposite directions away from each other by a spring 108 disposed in the servo pressure generating chamber 48. A movement of the first piston 100 by the spring 108 in the direction toward the caliper 16 is limited by a flange 110 which is formed at an open end of the cylindrical member 84 so as to extend in the radially inward direction, while a movement of the second piston 102 by the spring 106 in the direction away from the caliper 16 is limited by a flange 112 which is formed on the cap 86 so to extend in the radially inward direction. The first and second pistons 100, 102 have respective extensions 114, 116 extending from the end faces remote from the chamber 48. When the first and second pistons 100, 102 are held in abutting contact with the inward flanges 114 and 116, the extensions 114, 116 are positioned within respective holes 118, 120 at the open ends of the cylindrical member 84 and cap 86. The holes 118, 120 are defined by the radially inner ends of the inward flanges 114, 116, respectively.

The drive member 80 is a generally U-shaped member having a fixing portion 126, an arm portion 128, and a connecting plate portion 124 connecting the fixing and arm portions 126, 128. The connecting plate portion 124 takes the form of a plate having a width larger than the diameter of the cylindrical member 84. The fixing portion 126 extends from one of the opposite longitudinal ends of the connecting plate portion 124, in a direction on the side of the rotor 18. The fixing portion 126 has a planar part parallel to the surfaces of the rotor 18. The arm portion 128 extends from the other longitudinal end of the connecting plate portion 124, in the same direction as the fixing portion 126. The arm portion 128 is a planar part parallel to the axis L of the rotor 18. The drive member 80 is disposed so as to straddle over the cylinder housing 82 such that the connecting plate portion 124 is on the outer side of the rotor 18. The drive member 80 is connected to an arm 130 which extends from one of the two links 70, such that a pin 132 fixed to the arm 130 extends through an elongate hole 129 formed through the fixing portion 126, as shown in FIG. 1. Thus, the drive member 80 is pivotable about an axis parallel to the axis L. The fixing and arm portions 126, 128 have end faces 134, 136 facing the first and second pistons 100, 102 of the servo cylinder 78, respectively. On the end faces 134, 136, there are formed respective operating portions in the form of abutting projections 138, 140 for abutting contact with the extensions 114, 116 of the pistons 100, 102. The abutting projection 138 has a smaller length than the abutting projection 140, for the reason which will be explained.

The connecting plate portion 124 has an elongate hole 142 formed so as to extend in parallel to the centerline of the cylinder housing 82. Two screws 144 extend through the elongate hole 142 and are threaded to the projection 88 formed on the cylinder housing 82. These screws 144 and elongate hole 142 cooperate to guide the drive member 80 when the drive member 80 is moved relative to the stationary servo cylinder 78.

There will next be described the pressure control device 44 by reference to FIGS. 9–12.

The pressure control device 44 incorporates a pressure control valve 150 and a shut-off valve 152, which are accommodated in a common valve housing 154. The pressure control valve 150 includes a piston 156 which also serves as a valve spool, while the shut-off valve 152 includes a piston 158 which also serves as a valve opening member, as described below. The pistons 156 and 158 are disposed so as to extend at right angles to each other.

The valve housing 154 has a first port 160 communicating with the master cylinder 12; a second port 162 communicating with each pressure chamber 41, 42 of the wheel brake cylinders 24, 26 of the caliper 16; a third port 164 communicating with the port 107 (servo pressure generating chamber 48) of the servo cylinder 78 of the servo pressure generating device 46; and a fourth port 166 communicating with a reservoir 165.

The valve housing 154 further has: a by-pass passage 168 connecting the first and second ports 160, 162 while by-passing the pressure control valve 150; a by-pass passage 170 connecting the second and third ports 162, 164 while by-passing the pressure control valve 150; a check valve 172 provided in the by-pass passage 168; a check valve 174 in the by-pass passage 170; a fluid passage 176 connecting the third and fourth ports 164, 166; and a check valve 178 provided in the fluid passage 176. The shut-off valve 152 indicated above is provided in the by-pass passage 170 such that the valve 152 is connected to the third port 164 through the check valve 174 and to the fourth port 166 through the check valve 178.

The check valve 172 permits the brake fluid to flow therethrough in a direction from the master cylinder 12 toward the pressure chambers 41, 42 while the pressure in the master cylinder 12 is higher than the pressure in the pressure chambers 41, 42. The check valve 172 is closed when the pressure in the master cylinder 12 becomes higher than that in the pressure chambers 41, 42. Accordingly, during an initial period of depression of the brake pedal 10, the pressurized brake fluid is fed from the master cylinder 12 to the pressure chambers 41, 42 through the by-pass passage 168 and check valve 172 as well as through the pressure control valve 150. This arrangement is effective to avoid a delayed application of brake to the disc rotor 18 (58).

The check valve 174 permits the brake fluid to flow therethrough in a direction from the pressure chambers 41, 42 toward the servo pressure generating chamber 48 (port 107) of the servo pressure generating device 46, and inhibits a flow of the fluid in the opposite direction.

The check valve 178 permits the brake fluid to flow therethrough in a direction from the reservoir 165 toward the servo pressure generating chamber 48, and inhibits a flow of the fluid in the opposite direction. Accordingly, the brake fluid is supplied from the reservoir 165 to the servo pressure generating chamber 48 of the servo cylinder 78 while the pressure in the chamber 48 is lower than the atmospheric pressure.

The valve housing 154 also has a cylindrical hole 180, and a first pressure chamber 181 communicating with a closed end of the hole 180. The first pressure chamber 181 is connected to the first port 160 through the by-pass passage 168.

An auxiliary housing 182 is received in the hole 180, and is fixed in position by a threaded member 184. The auxiliary housing 182, which functions as a housing of the pressure control valve 150, is a cylindrical member which has a central cylinder bore 186, a second pressure chamber 194 and a third pressure chamber 196. The cylinder bore 186 receives the piston 156 indicated above. The second and third pressure chambers 194, 196 are radial holes which are formed through the housing 182 in the radial direction and which communicate with the central cylinder bore 186. The second pressure chamber 194 is connected to the second port 162 through a fluid passage 198, while the third pressure chamber 196 is connected to the third port 164 through a fluid passage 200.

Figure 10:
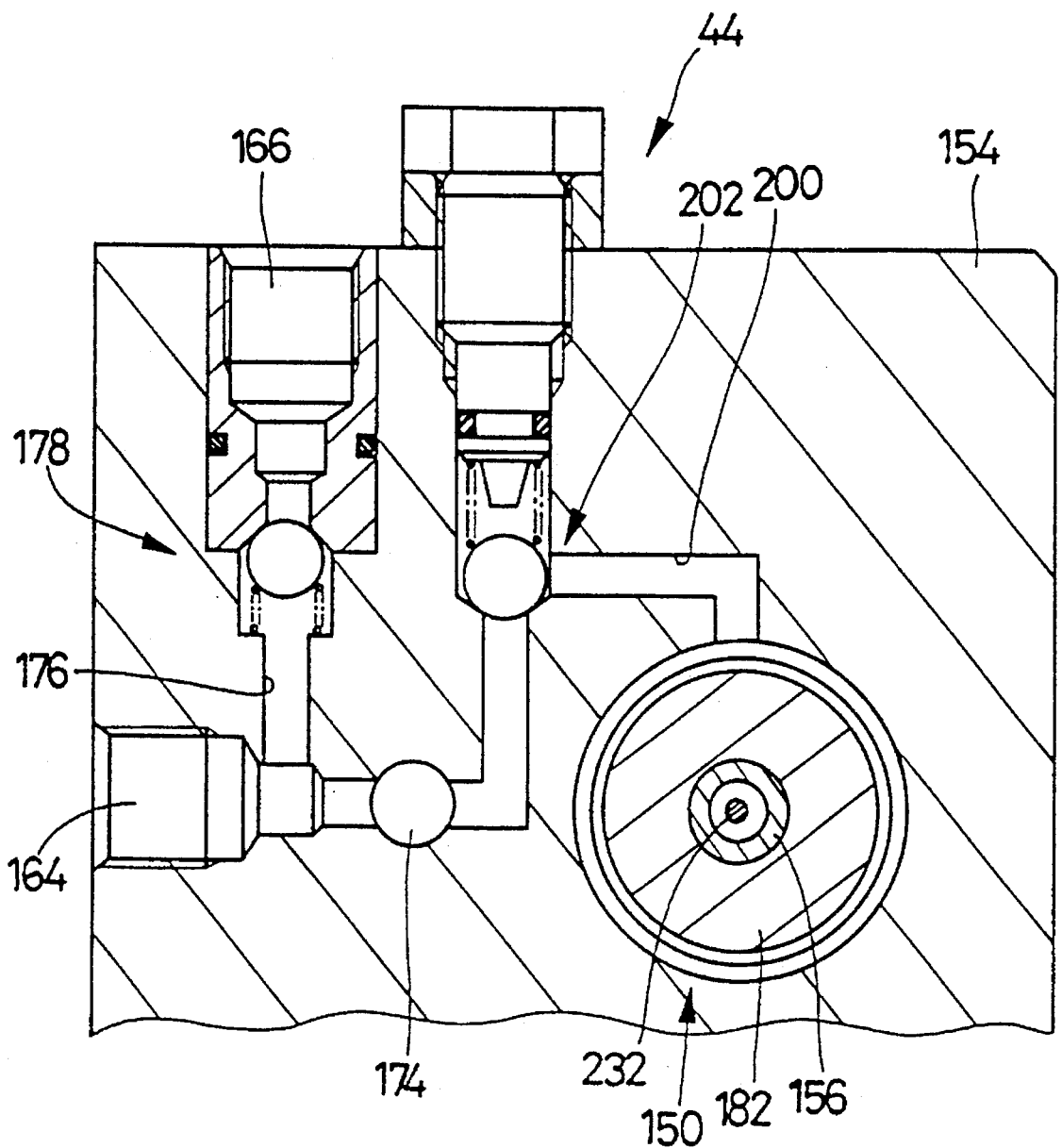
FIG. 10 is a cross sectional view taken along line 10—10 of FIG. 9.
Figure 12:
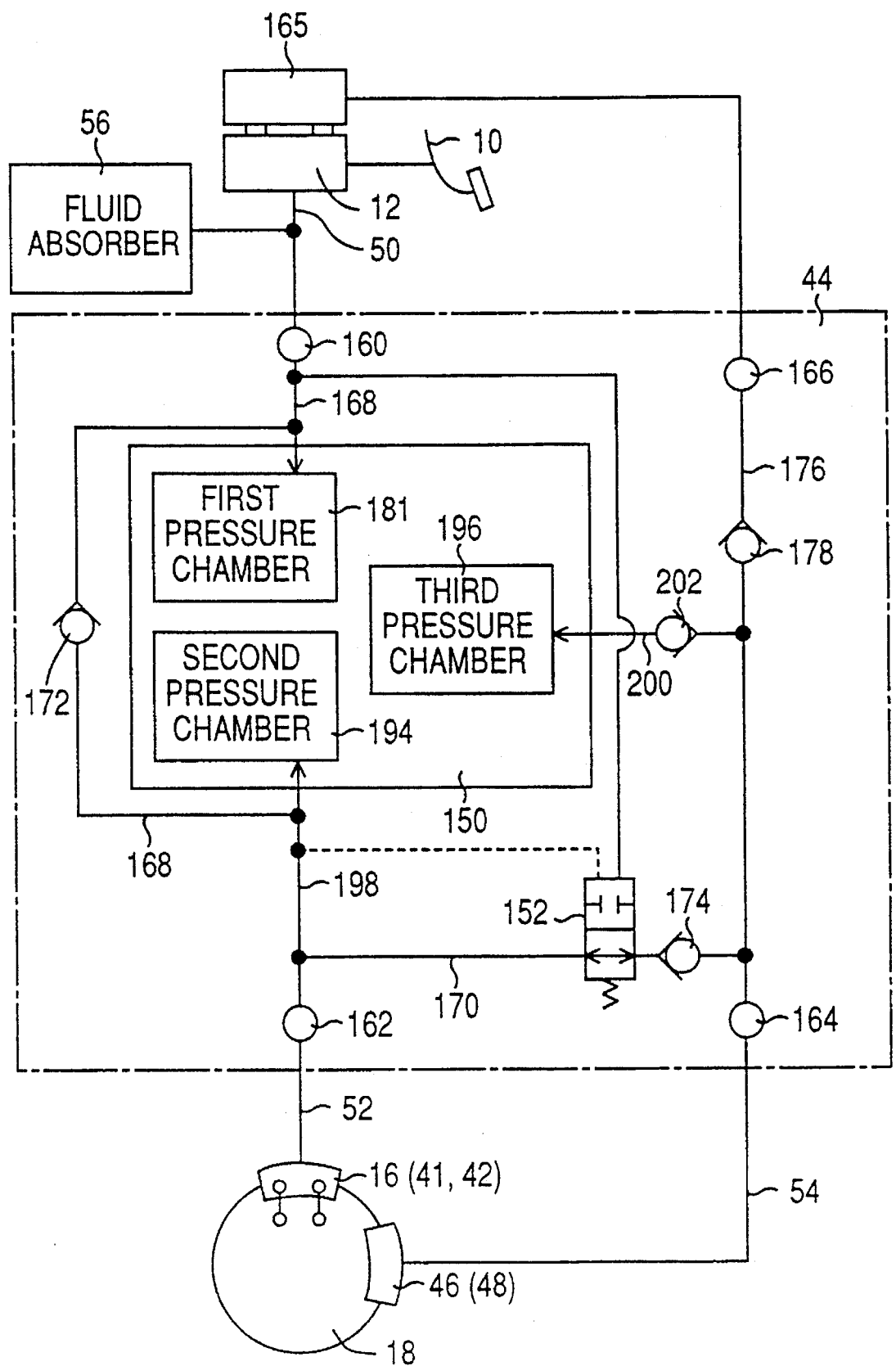
FIG. 12 is a diagram indicating a hydraulic circuitry in the brake system of FIG. 1.

As shown in FIG. 10 and 12, a check valve 202 is provided in the fluid passage 200. This check valve 202 permits the brake fluid to flow therethrough in a direction from the third port 164 toward the third pressure chamber 196, and inhibits a flow of the fluid in the opposite direction. Accordingly, the servo pressure generated in the servo pressure generating chamber 48 of the device 46 is applied to the third pressure chamber 196 through the check valve 202, to thereby raise the pressure in the third pressure chamber 196.

As described below in detail, the pressure in the third pressure chamber 196 is applied to the pressure chambers 41, 42 of the caliper 16 through the second pressure chamber 194 to thereby raise the pressure in the pressure chambers 41, 42 when the pressure control valve 150 is placed in its pressure-increase position in which the third pressure chamber 196 communicates with the second pressure chamber 194. However, the check valve 202 prevents the brake fluid to flow from the pressure chambers 41, 42 to the servo pressure generating chamber 48 through the second and third pressure chambers 194, 196 of the control valve 150 even when the pressure in the chamber 48 is lower than that in the chambers 41, 42 and when the control valve 150 is placed in the pressure-increase position.

The cylinder bore 186 formed in the auxiliary housing 182 is a stepped bore having a large-diameter portion and a small-diameter portion. The housing 182 has two annular grooves 206, 208 formed in the inner surfaces which define the large-diameter and small-diameter portions of the bore 186, respectively. These grooves 206, 208 serve as fluid passages. At the end of the small-diameter portion of the cylinder bore 186 remote from the large-diameter portion, there is disposed a cylindrical stop member 212 which will be described.

The piston 156 received in the cylinder bore 186 is a stepped member having a large-diameter portion 216 engaging the large-diameter portion of the bore 186, and a small-diameter portion 218 engaging the small-diameter portion of the bore 186.

The small-diameter portion 218 of the piston 156 has a center hole 220. An annular groove 222 is formed in a shoulder face between the large-diameter and small-diameter portions 216, 218, while an annular groove 224 is formed in the outer circumferential surface of the small-diameter portion 218. These grooves 222, 224 serve as fluid passages.

Figure 9:
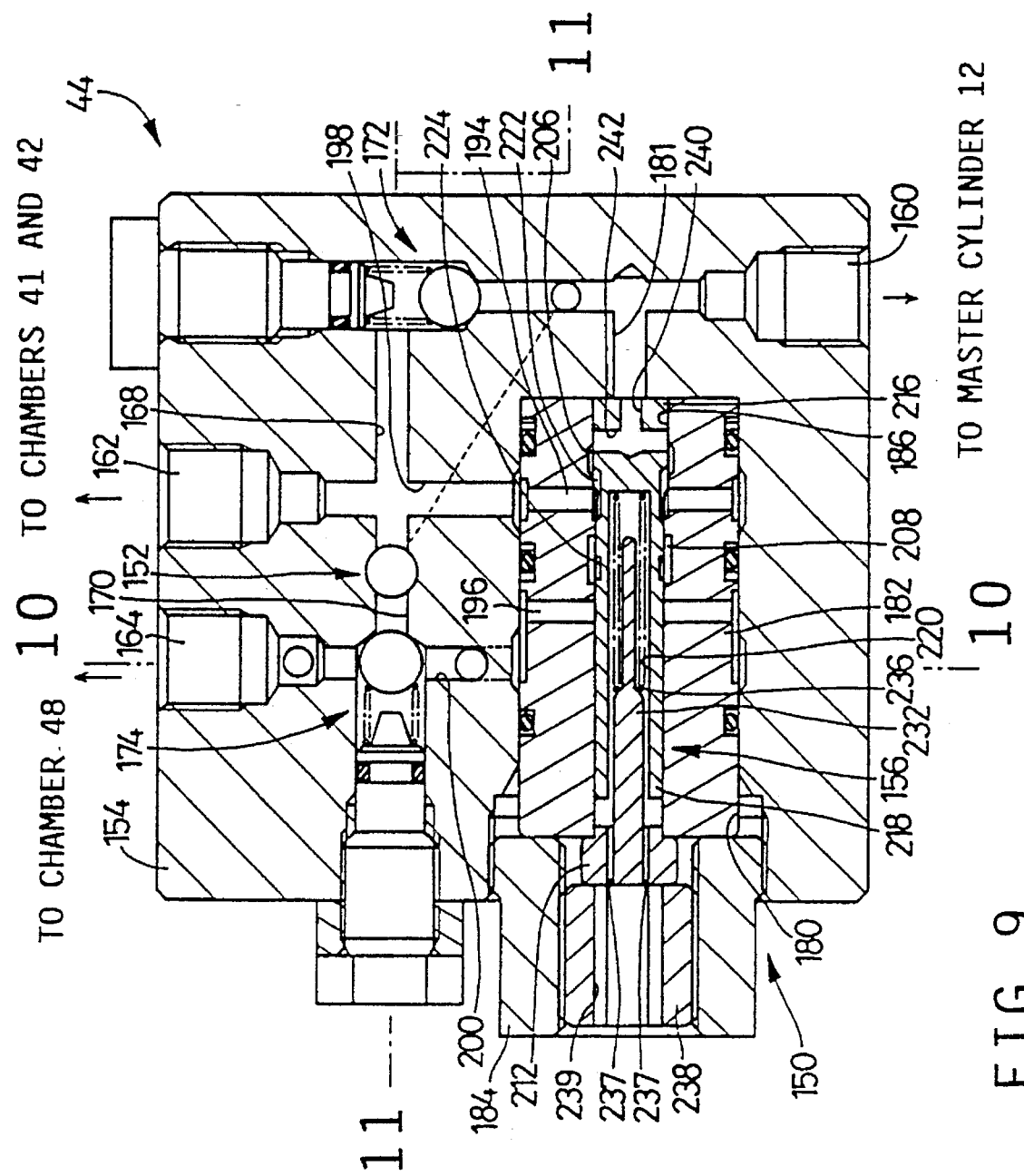
FIG. 9 is a cross sectional view taken along line 9—9 of FIG. 11, showing a pressure control valve used in the brake system of FIG. 1.

The stop member 212 has a shaft portion 232 extending from a radially central portion thereof into the center hole 220 of the piston 156. The shaft portion 232 is stepped with a shoulder face formed between large-diameter and small-diameter parts. Between this shoulder face of the shaft portion 232 and the bottom surface of the center hole 220, there is interposed a spring 236 which biases the piston 156 toward a fully retracted position thereof (in the right direction as seen in FIG. 9). The stop member 212 determines a fully advanced position of the piston 156.

The threaded member 184 threaded to the housing 154 has an internally threaded center bore, and an externally threaded member 238 engages the internally threaded center bore of the threaded member 184. The stop member 212 has a plurality of axial through-holes 237 which communicate with a tool engaging hole 239 formed through the externally threaded member 238. The tool engaging hole 239 has a hexagon shape in cross section and is open to the atmosphere, so that a space between the piston 156 and the stop member 212 is open to the atmosphere through the axial through-holes 237 and the tool engaging hole 239.

The piston 156 and the cylinder bore 186 has a clearance of as small as several microns, whereby the fluid tightness between the piston 156 and the bore 186 is provided without a sealing member. This arrangement assures a reduced sliding resistance of the piston 156.

To slidably move the piston 156 in the cylinder bore 186, a force acting on the piston 156 to advance the piston 156 should be larger than a force which corresponds to a sum of the set load of the spring 236 and the sliding resistance of the piston 156. The set load of the spring 236 is an initial load acting on the spring 236, that is, an initial biasing force produced by the spring 236. Since the sliding resistance of the piston 156 is made considerably small, the piston 156 will be advanced when the pressure in the first pressure chamber 181 (i.e., pressure Pm in the master cylinder 12) is raised to a level which is almost equal to a level corresponding to the set load of the spring 236.

If the fluid tightness between the piston 156 and the cylinder bore 186 is not enough to prevent leakage of the brake fluid, this drawback may be overcome by: replacing the threaded members 184, 238 and stop member 212 by an integrally formed plug; providing a sealing member between the plug and the housing 154; and providing a fluid passage which connects the fourth port 166 to a space between the piston 156 and the plug.

The large-diameter portion 216 of the piston 156 has fluid passages 240, 242 communicating with the first pressure chamber 181, so that the pressure Pm in the master cylinder 12 (hereinafter referred to simply as "master cylinder pressure Pm") is applied to the fluid passage 242.

Figure 11:
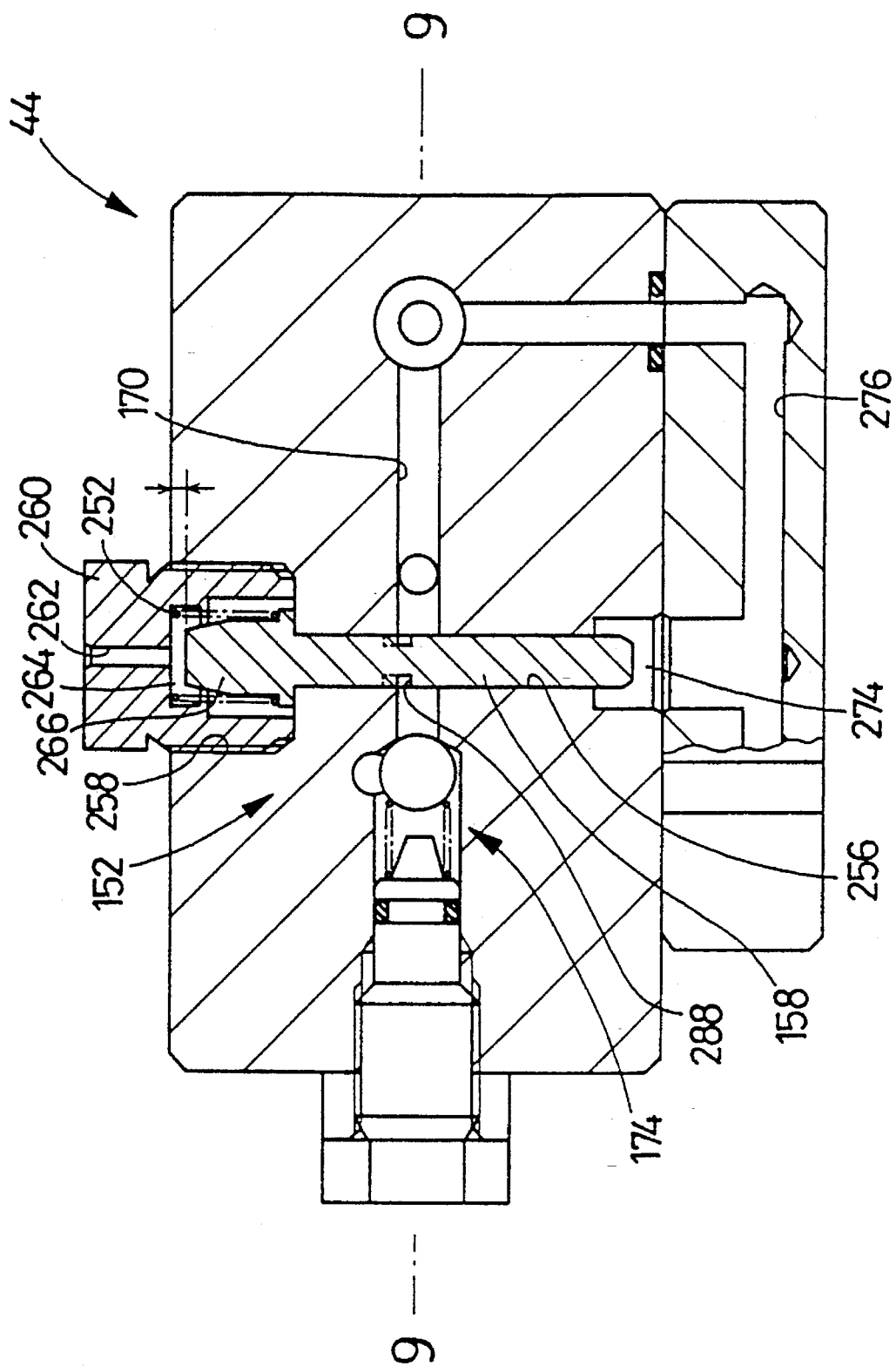
FIG. 11 is a cross sectional view taken along line 11—11 of FIG. 9.

The shut-off valve 152 provided in the by-pass passage 170 has the piston 158 indicated above, and biasing means in the form of a spring 252, as shown in FIG. 11. The piston 158 is received in a cylinder bore 256. The piston 158 and the cylinder bore 256 have a clearance of as small as several microns, so that the fluid tightness between the piston 158 and the bore 256 is provided without a sealing member. The cylinder bore 256 communicates at one end thereof with a tapped hole 258, and this tapped hole 258 is closed by a plug 260. The plug 260 has an atmospheric chamber 264 formed therein, which is open to the atmosphere through a through-hole 262. The atmospheric chamber 264 accommodates a head portion 266 of the piston 158 which has a relatively large diameter. The above-indicated spring 252 is interposed between the head portion 266 and the plug 260, for biasing the piston 158 toward a fluid chamber 274 communicating with the first port 160 through a pressure passage 274, so that the piston 158 receives the master cylinder pressure Pm through the fluid passage 276.

Like the piston 156 of the pressure control piston 150, the piston 158 of the shut-off valve 152 will be moved when the pressure in the pressure chamber 274 (i.e., master cylinder pressure Pm) becomes higher than a level which is almost equal to a level corresponding to the set load of the spring 252. The set load is an initial load acting on the spring 252, that is, an initial biasing force produced by the spring 252.

If the fluid tightness between the piston 158 and the cylinder bore 256 is insufficient, this drawback may be overcome by: eliminating the through-hole 262 formed in the plug 260; providing a sealing member between the plug 260 and the housing 154; and providing a fluid passage communicating with the first port 160.

Figure 18:
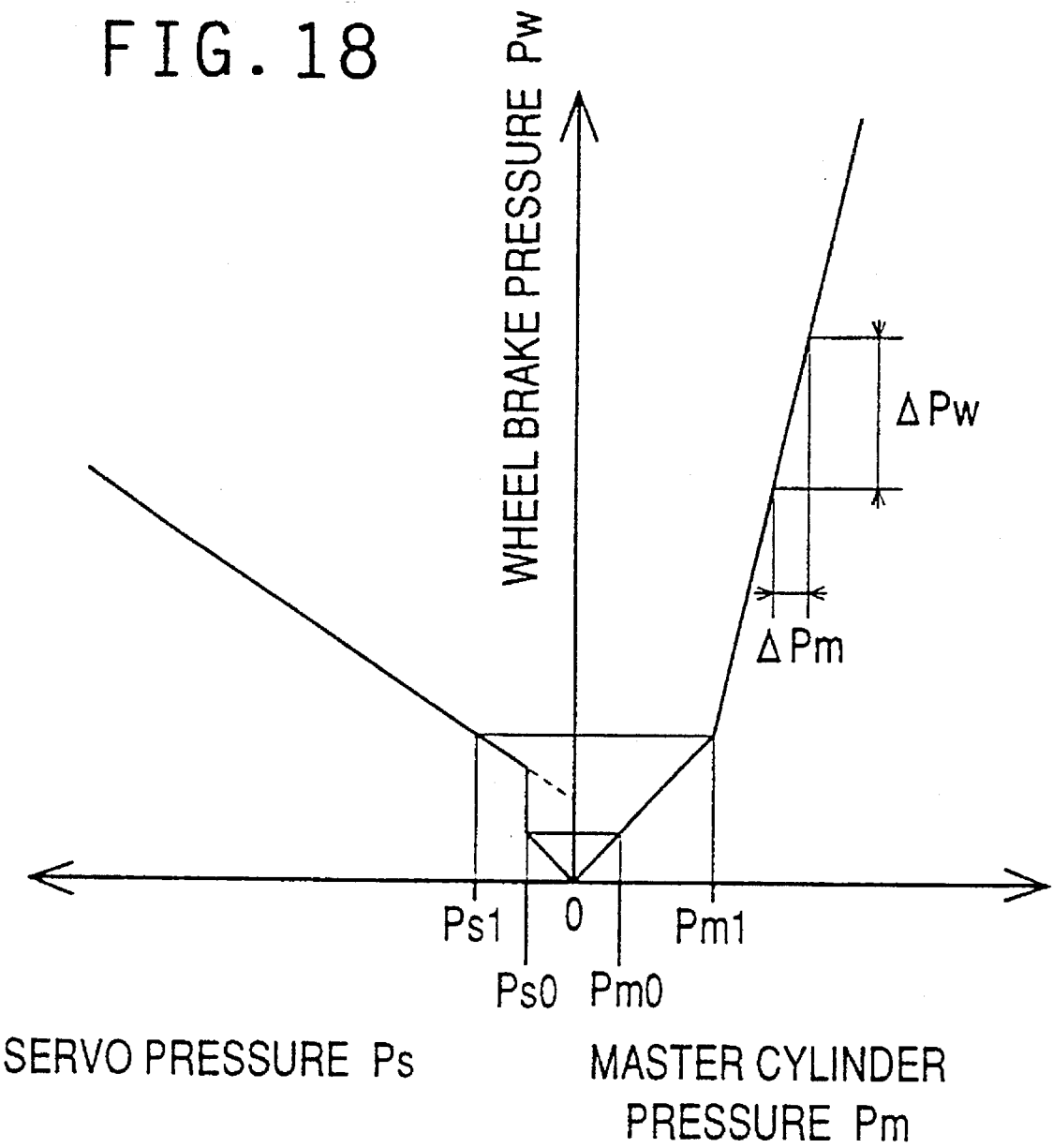
FIG. 18 is a graph indicating a relationship among a master cylinder pressure, a wheel brake pressure and a servo pressure in the brake system of FIG. 1.

The piston 158 has, in a middle portion thereof, an annular groove 288 which serves as a fluid passage. When the piston 158 is placed in its initial position of FIG. 11, the fluid passage 288 is aligned with the by-pass passage 170, whereby the by-pass passage 170 is in an open state for fluid communication between the second and third ports 162, 164. When the pressure in the pressure chamber 274 (master cylinder pressure Pm) becomes higher than the level corresponding to the set load of the spring 252, the piston 158 is moved toward the atmospheric chamber 264 against the biasing force of the spring 252, and the fluid passage 288 is moved away from the by-pass passage 170, whereby the by-pass passage 170 is cut by the piston 158 and placed in a closed state disconnecting the second and third ports 162, 164 from each other. The set load of the spring 252 is determined to be relatively low. For example, this set load is determined so that the by-pass passage 170 is closed just before the caliper 16 provides a substantial braking effect, namely, just before the servo pressure generating device 46 starts generating a servo pressure due to the braking effect by the caliper 16. In the present embodiment, the set load of the spring 252 is determined to correspond to a pressure $Ps_0$ in the servo pressure generating chamber 48, as indicated in FIG. 18, so that the by-pass passage 170 is closed at a relatively low master cylinder pressure $P_0$ at which the servo pressure is not generated by the servo pressure generating device 46 per se. Since the master cylinder pressure Pm is applied to the servo pressure generating chamber 48 of the device 46 until the by-pass passage 170 is closed at the master cylinder pressure $Pm_0$, the servo pressure Ps in the chamber 48 rises to the level $Ps_0$ with the master cylinder pressure Pm as the master cylinder pressure Pm rises to the level $Pm_0$, as indicated in FIG. 18. At the pressure $Ps_0$, the servo pressure generating device 46 starts its operation by the movement of the caliper 16 when the caliper 16 provides a substantial braking effect.

Figure 13:
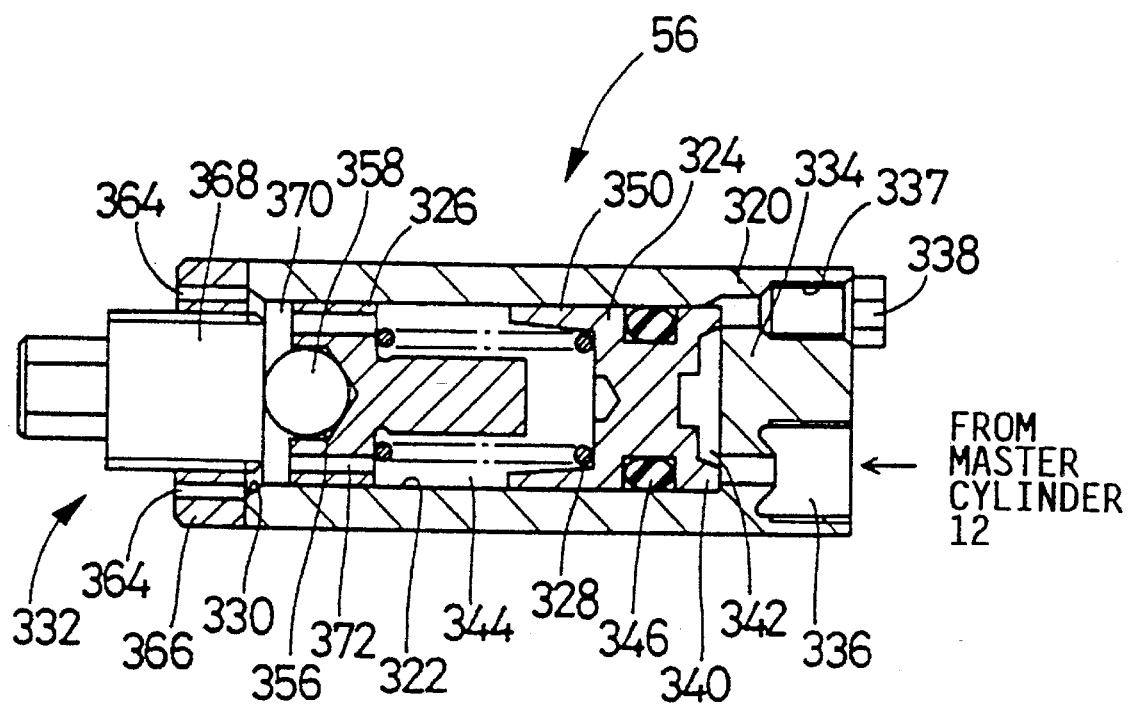
FIG. 13 is a front elevational view of a fluid absorber provided in the brake system of FIG. 1.

The fluid absorber 56 functions as an accumulator for accommodating the brake fluid-such that the pressure in the accumulator increases with an increase in the amount of the brake fluid accommodated in the accumulator. The fluid absorber 56 is connected to the fluid passage 50 as shown in FIGS. 1 and 12 has a cylindrical housing 320 having a cylinder bore 322 which is closed at one end, as shown in FIG. 13. The cylinder bore 322 accommodates a piston 324, a stop member 326, and a spring 328. At an open end 330 of the housing 320, there is disposed a set load adjusting device 332 for adjusting the set load or initial biasing force of the spring 328. The housing 320 has ports 336 and 337 formed through its bottom wall 334. The port 336 is connected to the master cylinder 12, while the port 337 is closed by an air bleeder 338.

The piston 324 has an annular projection 340 formed at its end face facing the bottom wall 334 of the housing 320. The annular projection 340 has the same outside diameter as the body of the piston 324. A pressure chamber 342 is formed between the annular projection 340 and the bottom wall 334, and communicates with the port 336. The pressure chamber 342 functions as a fluid absorbing chamber for accommodating the brake fluid. The pressure chamber 342 receives the master cylinder pressure Pm. A first atmospheric pressure chamber 344 is formed between the piston 324 and the stop member 326. This chamber 344 is fluid-tightly disconnected from the pressure chamber 342 by an O-ring 346 fitted on the outer circumferential surface of the piston 324. The piston 324 also has an annular retainer 350 formed at its end facing the stop member 326. The retainer 350 has the same outside diameter as the body of the piston 324. On the other hand, the stop member 326 is a stepped member having a large-diameter portion and a small-diameter portion. A spring 328 is disposed between the retainer 350 and a shoulder face between the large-diameter and small-diameter portions of the stop member 326. The spring 328 biases the piston 324 toward the bottom wall 334, namely, toward its fully retracted position which is determined by abutting contact of the projection 340 with the bottom wall 334.

The stop member 326 has an engaging hole 356 formed in a central part of the end face facing the set load adjusting device 332. The engaging hole 356 engages a spherical transmission member 358.

The set load adjusting device 332 includes a cover 366 having a tapped hole, and an adjusting screw 368 threaded to the tapped hole of the cover 366. The cover 366 has a plurality of axial through-holes. The adjusting screw 368 has an end face held in contact with the transmission member 356. The stop member 326 is moved against the biasing force of the spring 328 by rotating the adjusting screw 368. That is, a movement of the adjusting screw 368 is transmitted to the stop member 326 through the transmission member 326.

A second atmospheric pressure chamber 370 is formed between the stop member 326 and the set load adjusting device 332. This pressure chamber 370 is open to the atmosphere through the through-holes 364. The stop member 326 has a plurality of axial through-holes 372 for communication between the first and second atmospheric pressure chambers 344, 370.

When the adjusting screw 368 is rotated in one direction and moved in the right direction as seen in FIG. 13, the stop member 326 is moved in the right direction, and a distance between the stop member 326 and the piston 324 is reduced to thereby compress the spring 328, whereby the set load of the spring 328 is increased, and the maximum distance of movement of the piston 324 is reduced. When the adjusting screw 368 is rotated in the opposite direction and moved in the left direction, the stop member 326 is moved in the left direction by the biasing force of the spring 328, whereby the spring 328 is elongated to reduce the set load, and the maximum distance of movement of the piston 324 is increased.

The piston 324 is held in its fully retracted position (rightmost position as seen in FIG. 13) while a force produced by the pressure in the pressure chamber 342 (master cylinder pressure Pm) is smaller than the set load of the spring 328. When the force produced by the master cylinder pressure Pm in the pressure chamber 342 exceeds the set load of the spring 328, the piston 324 is moved in the left direction or advanced. Accordingly, the piston 324 is advanced as the master cylinder pressure Pm is increased, namely, as the operating stroke of the brake pedal 10 is increased, that is, as the brake pedal 10 is depressed. The distance of movement of the piston 324 per a given depression force acting on the brake pedal 10 decreases with an increase in the spring constant of the spring 328, that is, increases with a decrease in the spring constant.

The set load of the spring 328 is determined so that the piston 324 begins to be advanced upon an abrupt increase in the pressure in the pressure chamber 342 of the fluid absorber 56 due to an increase in the master cylinder pressure Pm upon depression of the brake pedal 10 and due to a flow of the pressurized brake fluid from the second pressure chamber 194 of the pressure control valve 150 into the fluid passage 50.

Figure 14:
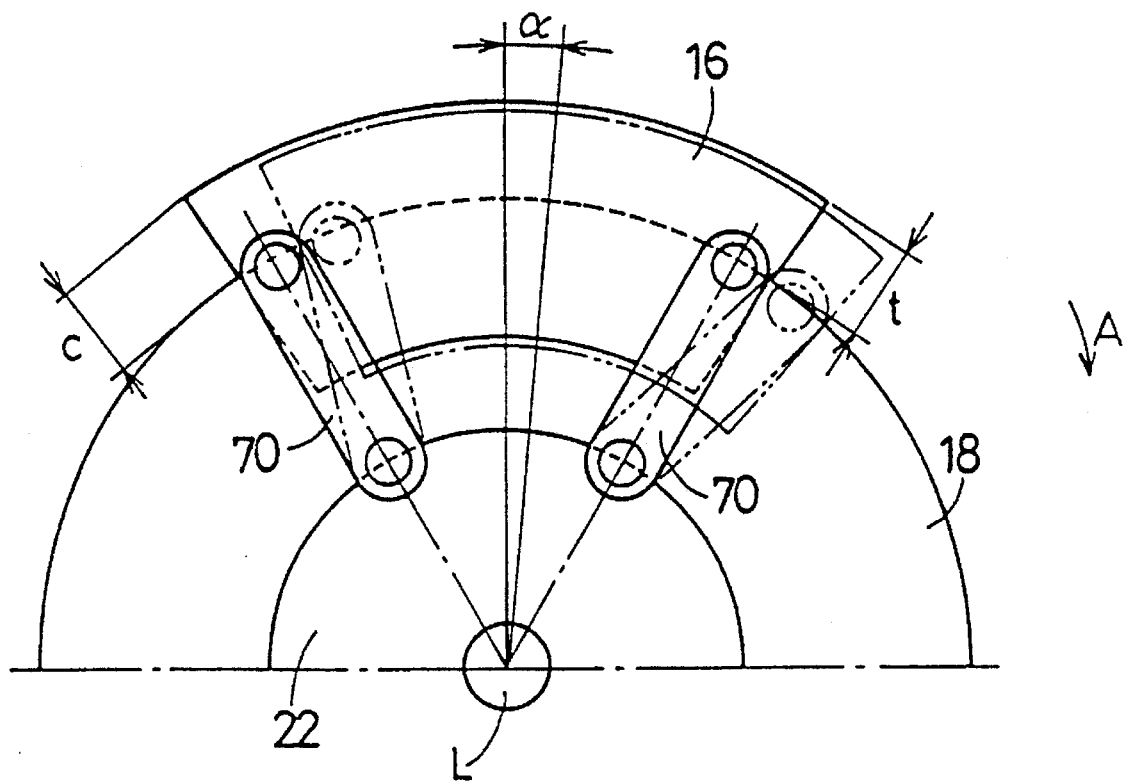
FIG. 14 is a view illustrating a caliper of the disc brake of FIG. 7 placed in two positions before and after brake application.
Figure 15:
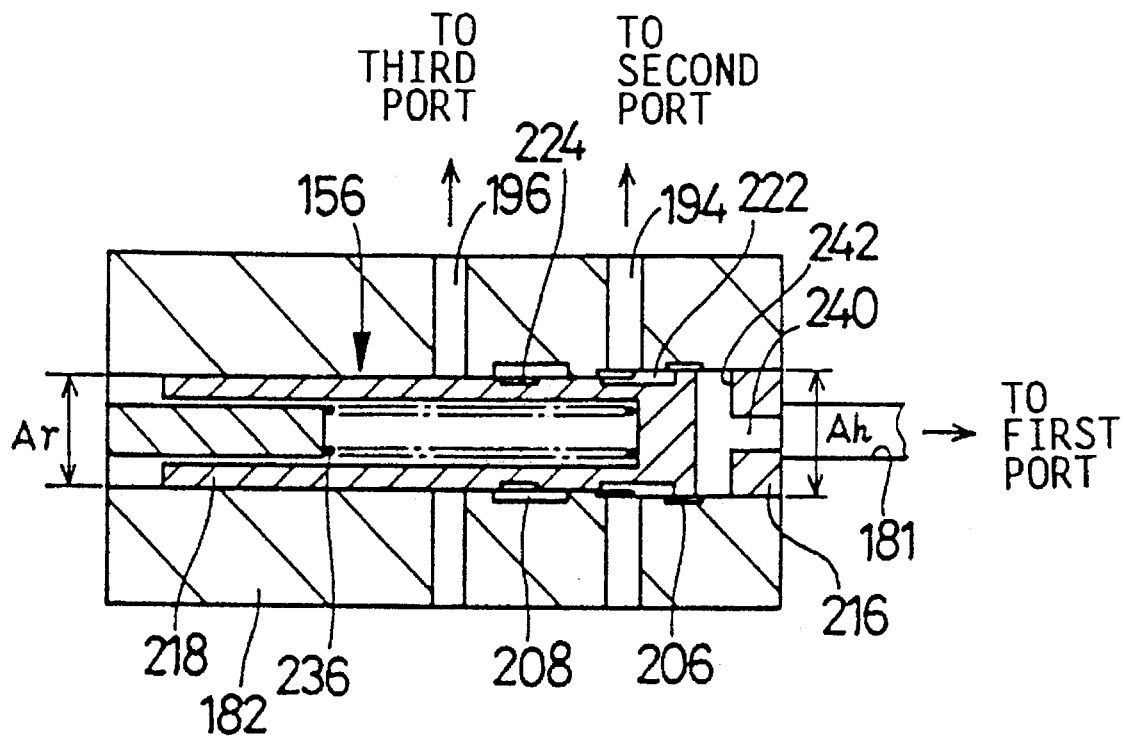
FIG. 15 is a front elevational view in cross section schematically showing the pressure control valve of FIG. 9.
Figure 16:
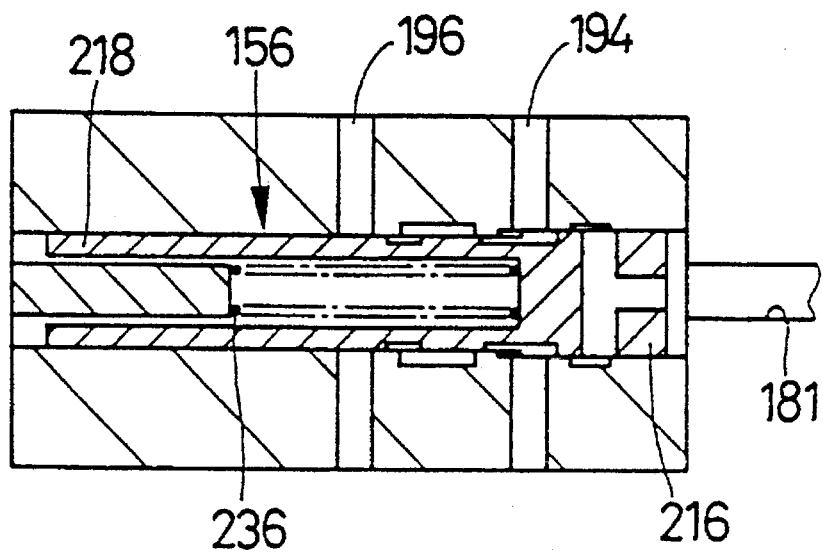
FIG. 16 is a front elevational view showing the pressure control valve placed in a position different from that of FIG. 15.
Figure 17:
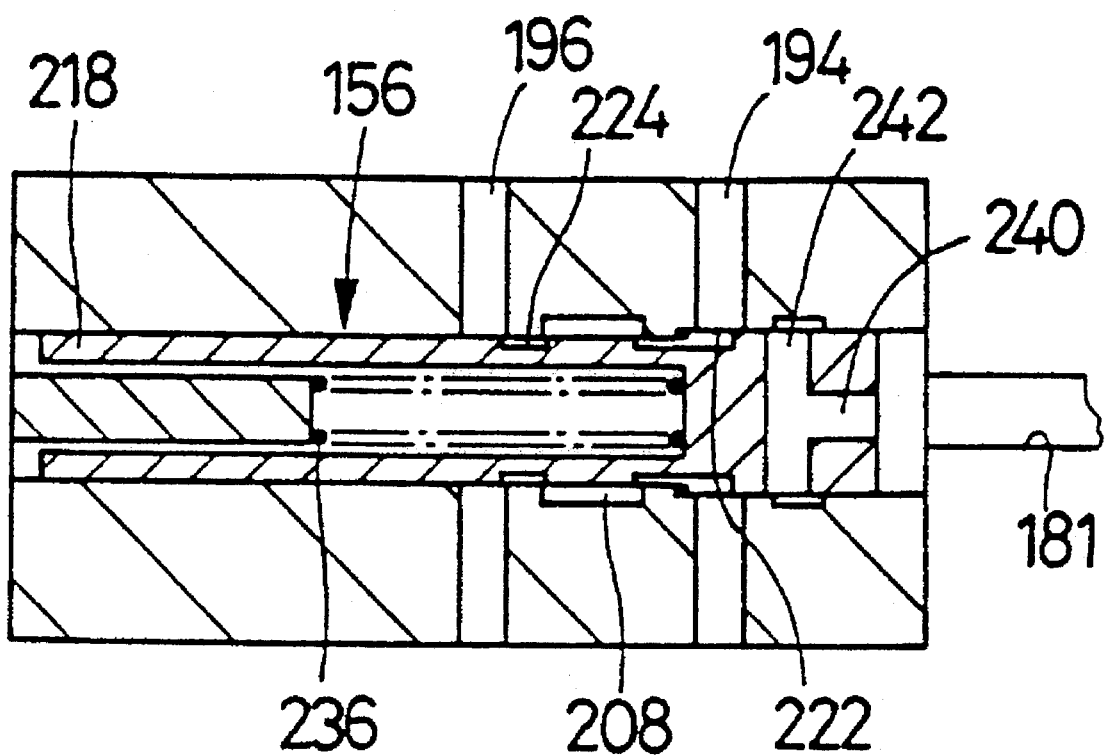
FIG. 17 is a front elevational view showing the pressure control valve placed in another position different from those of FIGS. 15 and 16.

There will next be described an operation of the present hydraulically brake system constructed as described above, by reference to FIGS. 14–21. It is noted that FIGS. 15–17 are simplified views of the pressure control valve 150. The following description refers to only operations of the brake system associated with the front caliper 16 (for one of the two front wheels) upon application of the master cylinder pressure Pm to the pressure chambers 41, 42. Operations of the brake system associated with the rear caliper 17 will not be described, since these operations are similar to those associated with the front caliper 16.

While the vehicle is running without brake application, the rotor 18 rotates with the corresponding front wheel, and the first and second pistons 100, 102 of the servo pressure generating device 46 are held in abutting contact with the inward flanges 110, 112 while the abutting projections 138, 140 of the drive member 80 are held in their neutral positions close to the extensions 114, 116 of the pistons 100, 102, as shown in FIG. 2. Accordingly, no servo pressure 48 is generated in the servo pressure generating chamber Ps of the device 46. On the other hand, the piston 156 of the pressure control valve 150 is held in its fully retracted or original position under the biasing force of the spring 236, as shown in FIG. 15. In this position, the pressure control valve 150 holds the wheel brake 24, 26 of the caliper 16 in communication with the master cylinder 12. That is, the pressure control valve 150 is in the pressure-increase position in which the first and second pressure chambers 181, 194 communicate with each other for communication between the master cylinder 12 and the wheel brake cylinders 24, 26 of the caliper 16.

The shut-off valve 152 is in the open position in which the annular fluid passage 288 of the piston 158 is aligned with the by-pass passage 170, that is, the by-pass passage 170 is held open. The piston 324 of the fluid absorber 56 is held in its fully retracted position.

When the brake pedal 10 is depressed by the vehicle operator, the master cylinder pressure Pm is applied to the wheel brake cylinders 24, 26 in the front caliper 16, through the first port 160, first pressure chamber 181, fluid passages 240, 242, 206, 222, second pressure chamber 194, fluid passage 198, second port 162 and fluid passage 52. Simultaneously, the master cylinder pressure Pm is also fed to the cylinders 24, 26 through the by-pass passage 168 and check valve 172. In the present embodiment wherein the by-pass passage 168 and check valve 172 are provided, a sufficient amount of the pressurized brake fluid is fed from the master cylinder 12 into the cylinders 24, 26, during an initial period of operation of the brake pedal 10, whereby a braking effect is provided by the caliper 16 without a significant delay.

In this point of operation of the brake pedal 10, the master cylinder pressure Pm is equal to the pressure Pw in the wheel brake cylinders 24, 26 (hereinafter referred to simply as "wheel brake pressure Pw"). That is, Pm=Pw.

While the master cylinder pressure Pm is lower than the preset level $Pm_0$, the piston 158 of the shut-off valve 152 is held in the original position of FIG. 11, holding the by-pass passage 170 in the open state, whereby the servo pressure Ps in the servo pressure generating chamber 48 increases with the master cylinder Pm, as indicated in FIG. 18. Since the level $Pm_0$ is considerably low, the pressure in the pressure chamber 274 of the shut-off valve 152 rises above the level $Pm_0$, moving the piston 158 to be moved against the biasing force of the spring 252, when the depression force or operating stroke of the brake pedal 10 is relatively small. As a result, the fluid passage 288 is out of alignment with the by-pass passage 170, and the by-pass passage 170 is closed, whereby the servo pressure Ps does not increase above the level $Ps_0$ corresponding to the master cylinder pressure $Pm_0$, as indicated in FIG. 18.

In the fluid absorber 56, the piston 324 is held in the fully retracted position as long as a force produced by the pressure in the pressure chamber 342 is smaller than the set load or initial biasing force of the spring 328.

The wheel brake pressure Pw in the wheel brake cylinders 24, 26 moves the pistons 28, 30 so as to force the pads 32, 34 against the opposite friction surfaces of the rotor 18, whereby the rotor 18 is braked. At this time, a torque is applied to the caliper 16 in the rotating direction of the rotor 18 indicated by solid-line arrow in FIG. 1, whereby the links 70 are pivoted by a small angle at a position distant from the axis L of the rotor 18 in a plane perpendicular to the axis L. Since the links 70 extend substantially in the radial direction of the rotor 18, the caliper 16 is rotated by a small angle about an axis substantially aligned with the axis L of the rotor L when the links 70 are pivoted.

Described in detail by reference to FIG. 14, the caliper 16 is rotated by an angle α about the axis L, as indicated by arrow A, that is, moved from the position indicated by solid lines to the position indicated by two-dot chain lines substantially in the rotating direction of the rotor 18, such that distances "t" and "c" at the front and rear ends of the caliper 16 remain substantially unchanged before and after the movement of the caliper 16. The distances "t" and "c" are distances between the outer circumference of the rotor 18 and the outer end of the caliper 16 as viewed in the radial direction of the rotor 18. Accordingly, the caliper 16 will not interfere with the outer circumferential surface of the rotor 18 at its front end, or with the wheel disk at its rear end, when the caliper 16 is moved in the rotating direction of the rotor 18.

The rotor 18 is rotated in the direction indicated by the solid-line arrow in FIG. 1 when the vehicle is running forward, and the caliper 16 is moved in the rotating direction of the rotor 18 due to a torque transmitted from the rotor 18 during brake application with the pads 32, 34 forced against the rotor 18. As result of the rotary movement of the caliper 16, a tensile or pull force acts on the drive member 80 of the servo pressure generating device 46, whereby the drive member 80 is moved in the rotating direction of the rotor 18, so that the second piston 102 is moved toward the first piston 100 against the biasing action of the spring 108. Consequently, the volume of the servo pressure generating chamber 48 is reduced. The second piston 102 moved to the position nearest to the first piston 100 is shown in FIG. 3. In this position, the volume of the chamber 48 is the smallest, and the servo pressure Ps is the highest. In operation of the device 46, the second piston 102 is moved to a position of equilibrium in which the force produced by the generated servo pressure Ps is equal to the pull force acting on the drive member 80 due to the rotation of the caliper 16 about the axis L.

The servo pressure Ps generated in the chamber 48 of the device 46 is applied through the port 107 to the third port 164 of the pressure control valve 150 of the pressure control device 44, and to the third pressure chamber 196 of the pressure control valve 150 through the check valve 202, as indicated in FIG. 12. It is noted that the end of each link 70 at which the link 70 is connected to the caliper 16 is moved by a small distance in the radial direction of the rotor 18, and the arm 130 is accordingly moved. Since the arm 130 is connected to the fixing portion 126 of the drive member 80 through the elongate hole 129 and pin 132 as indicated in FIG. 2, the drive member 80 is moved in a direction tangent to a circle whose center lies on the axis L of the rotor 18, while allowing the arm 130 to move in the radial direction of the rotor 18.

As the master cylinder pressure Pm is increased to a level at which the following formula (1) is satisfied in the pressure control valve 150, the piston 156 starts to be advanced:

$$Pm.Ar > F_0 + f \quad (1)$$

where,

Ar: cross sectional area of the small-diameter portion 218 of the piston 156, as indicated in FIG. 15, $F_0$: set load of the spring 236, f: friction resistance of the piston 156.

When the piston 156 is advanced by a small distance against the biasing force of the spring 236 as indicated in FIG. 16, the first port 160 and the second port are disconnected from each other, and none of the master cylinder pressure Pm and the servo pressure Ps are applied to the wheel brake cylinders 24, 26. The first and second ports 160, 162 are held disconnected as long as the following formula (2) is satisfied:

$$F_1 - f \leq Pm.Ah - Pw(Ah - Ar) \leq F_2 f \quad (2)$$

where,

Ah: cross sectional area of the large-diameter portion 216 of the piston 156, as indicated in FIG. 15, $F_1$: biasing force of the spring 236 at the moment of disconnection of the fluid passages 206 and 222 from each other, $F_2$: biasing force of the spring 236 at the moment of connection of the fluid passage 224 with the second pressure chamber 196.

When the master cylinder pressure Pm is further increased to a level at which the following formula (3) is satisfied, the piston 156 is further advanced, and the second and third ports 162 and 164 are connected to each other, that is, the pressure control valve is placed in the pressure-increase position:

$$Pm.Ah > Pw(Ah - Ar) + F_2 + f \quad (3)$$

As a result, the servo pressure Ps is applied from the third port 164 to the wheel brake cylinders 24, 26 of the caliper 16 through the fluid passages 54 and 200, check valve 202, third pressure chamber 196, fluid passages 224, 208, 222, second pressure chamber 194 and second port 162, whereby the force exerted from the pads 32, 34 onto the rotor 18 is increased.

When the following formula (4) is satisfied with the servo pressure Ps applied to the wheel brake cylinders 24, 26, the second and third ports 162, 164 are disconnected from each other again, and the pressure control valve 150 is placed in its pressure-hold state, so that the wheel brake pressure Pw is held at a level which is higher than and substantially proportional to the master cylinder pressure Pm.

In other words, before the above formula (1) is satisfied, that is, while the master cylinder pressure Pm is lower than a level Pm1 (FIG. 18) which is equal to $\{(F_0=f)/Ar\}$, the piston 156 is placed in its fully retracted position, and the pressure control valve 150 is placed in a first state in which the first and second ports 160, 162 communicate with each other. In this first state, the wheel brake pressure Pw is held equal to the master cylinder pressure Pm. In the graph of FIG. 18, the relationship among the master cylinder pressure Pm, wheel brake pressure Pw and servo pressure Ps while the valve 150 is in the first state is indicated within an area enclosed by inverted U-shaped line which begins at point $Pm_1$ and ends at point $Ps_1$. In the graph of FIG. 18, influences of a variation in the biasing force of the spring 236 and a hysteresis based on the friction resistance f of the piston 156 are not taken into account, in the interest of simplification.

When the master cylinder pressure Pm becomes higher than the preset level $Pm_1$, that is, when the above formula (1) is satisfied, the piston 156 starts an advancing movement, and the pressure control valve 150 is eventually placed in its second state in which the second and third ports 162, 164 communicate with each other. Then, the second and third ports 162, 164 are disconnected from each other to hold the wheel brake pressure Pw at a level which is higher than and proportional to the master cylinder pressure Pm, as indicated in the graph of FIG. 18. The wheel brake pressure Pw rises at a rate or gradient determined by the cross sectional areas (pressure-receiving areas) Ar and Ah of the small-diameter and large-diameter portions 218 and 216 of the piston 158, so that the amount of increase ΔPw of the wheel brake pressure Pw per unit time is larger than the amount of increase ΔPm of the master cylinder pressure Pm per unit time, as also indicated in FIG. 18.

The transition of the pressure control valve 150 from the first state to the second state is effected after the servo pressure Ps exceeds the master cylinder pressure Pm. As explained above, the servo pressure Ps is generated by reduction of the volume of the servo pressure generating chamber 48, which takes place by activation of the drive member 80 with a pull or tensile force acting thereon due to a rotary movement of the caliper 16 caused by a torque transmitted from the rotor 18 via the pads 32, 34 which are forced against the friction surfaces of the rotor 18 by the wheel brake pressure Pw. No pressure is generated in the servo pressure generating chamber 48 when the torque transmitted to the caliper 16 is smaller than a given value, namely, when the wheel brake pressure Pw is lower than a given level. The preset level $Pm_1$ indicated above is determined to be the wheel brake pressure Pw (equal to the master cylinder pressure) after the servo pressure Ps higher than the master cylinder pressure Pm is generated in the servo pressure generating chamber 48.

The check valve 202 permits a flow of the fluid from the third port 164 toward the third pressure chamber 196 when the pressure at the third port 164 is higher than the pressure in the third pressure chamber 196, that is, when the servo pressure Ps is generated by the servo pressure generating device 46. Therefore, the servo pressure Ps is applied to the third pressure chamber 196 when the pressure control valve 150 is brought to its second state.

The cross sectional areas of the first and second pistons 100, 102 of the servo pressure generating device 46 are determined so that the servo pressure Ps higher than the master cylinder pressure Pm is generated in the servo pressure generating chamber 48. The check valve 178 inhibits a flow of the fluid from the servo pressure generating chamber 48 toward the reservoir 165, and the servo pressure Ps is applied to the third pressure chamber 196 when the valve 150 is in the second state.

As described above, the servo pressure Ps generated in the chamber 48 is applied to the second pressure chamber 194 when the pressure control valve 150 is operated from the first state to the second state. Accordingly, the pressure in the second pressure chamber 194 suddenly rises, and the above formula (4) is satisfied, whereby the piston 156 is retracted, and the brake fluid flows from the first pressure chamber 181 back into the fluid passage 50. As a result, the pressure in the pressure chamber 342 in the fluid absorber 56 becomes higher than the level corresponding to the set load or initial biasing force of the spring 328, and the piston 324 is advanced. Thus, the fluid absorber 56 functions to absorb a portion of the brake fluid which flows from the first pressure chamber 181 of the pressure control valve 150 toward the master cylinder 12. Consequently, the fluid absorber 56 serves to reduce the amount of an abrupt rise of the master cylinder pressure Pm when the pressure control valve 150 is operated from the first state to the second state.

Figure 19:
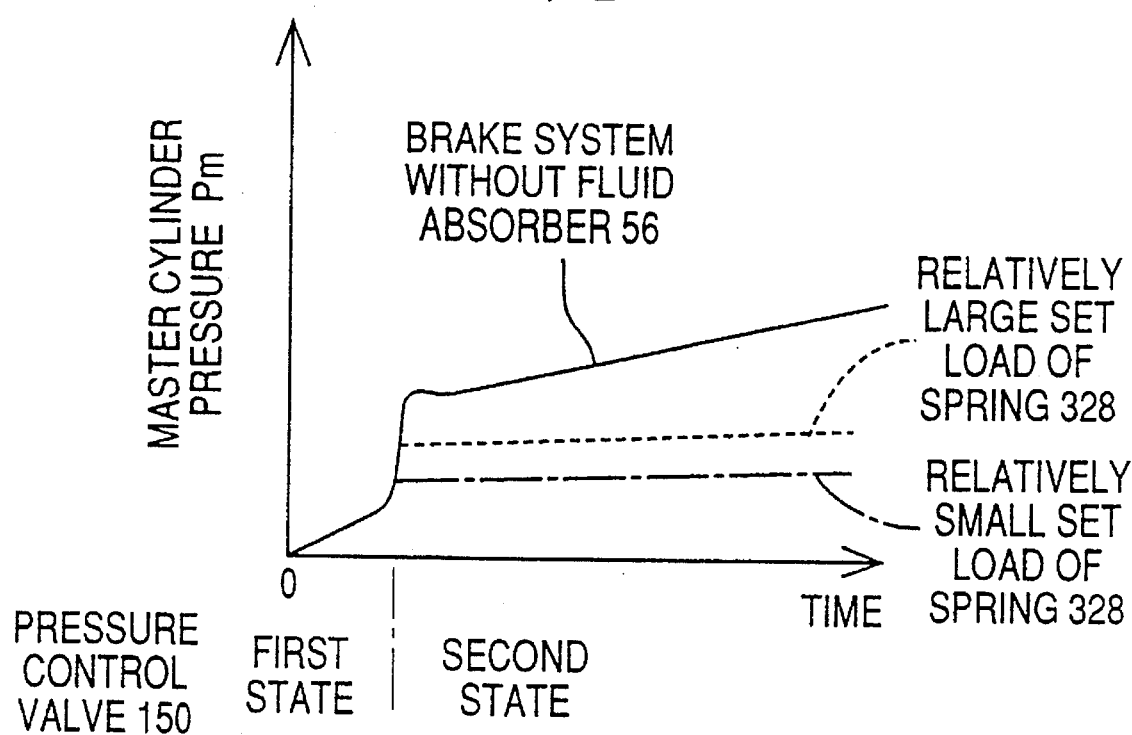
FIG. 19 is a graph indicating a relationship between the master cylinder pressure and a brake pedal operating force in the brake system of FIG. 1.

Described more specifically, the graph of FIG. 19 shows a change in the master cylinder Pm when the depression force acting on the brake pedal 10 is increased at a given rate. While a brake system not provided with the fluid absorber 56 suffers from a considerably large sudden increase of the master cylinder pressure Pm as indicated by solid line in FIG. 19, the provision of the fluid absorber 56 in the present brake system is effective to reduce the amount of increase of the master cylinder pressure Pm as indicated by dashed line or one-dot chain line.

Figure 20:
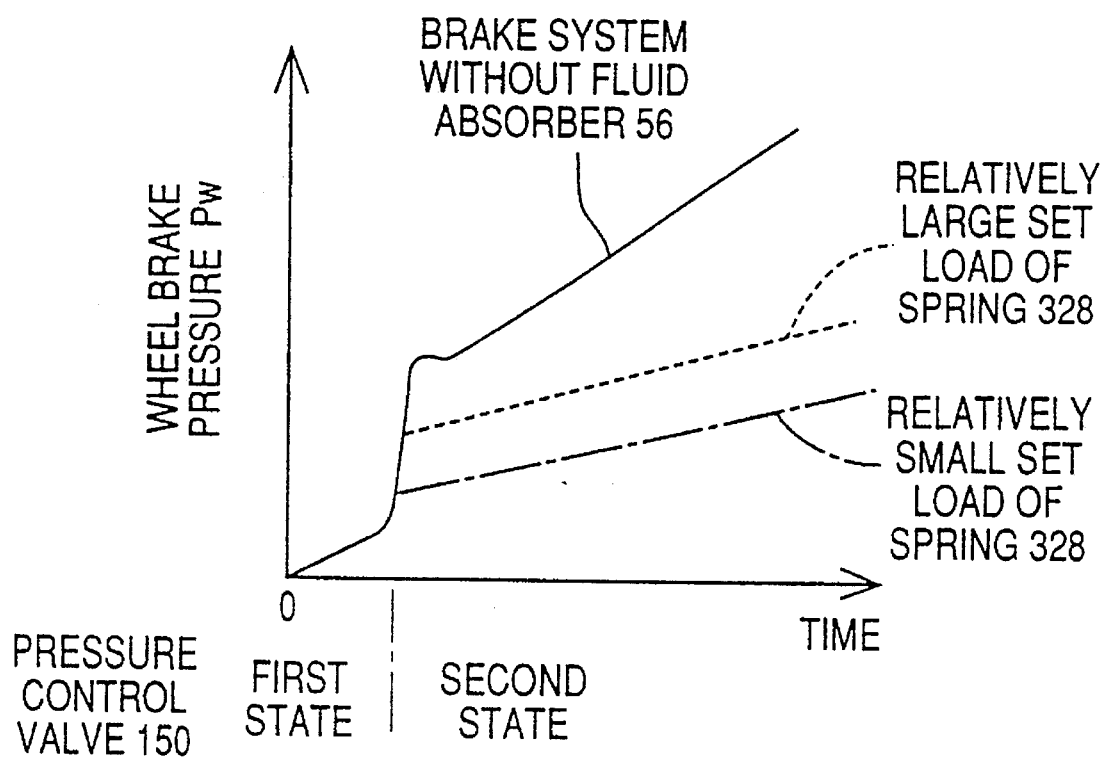
FIG. 20 is a graph indicating a relationship between the wheel brake cylinder and the brake pedal operating force in the brake system.

Further, the pressure control valve 150 is adapted to control the pressure in the second pressure chamber 194 depending upon the master cylinder pressure Pm, and the amount of sudden increase of the wheel brake pressure Pw is also restricted as indicated by dashed or one-dot chain line in the graph of FIG. 20. Accordingly, the amount of increase of the braking force applied to the rotor 18 upon transition of the valve 150 from the first state to the second state is reduced, and the controllability of the braking force is improved. In other words, the braking force can be easily controlled when the depression force acting on the brake pedal 10 is comparatively small.

Figure 21:
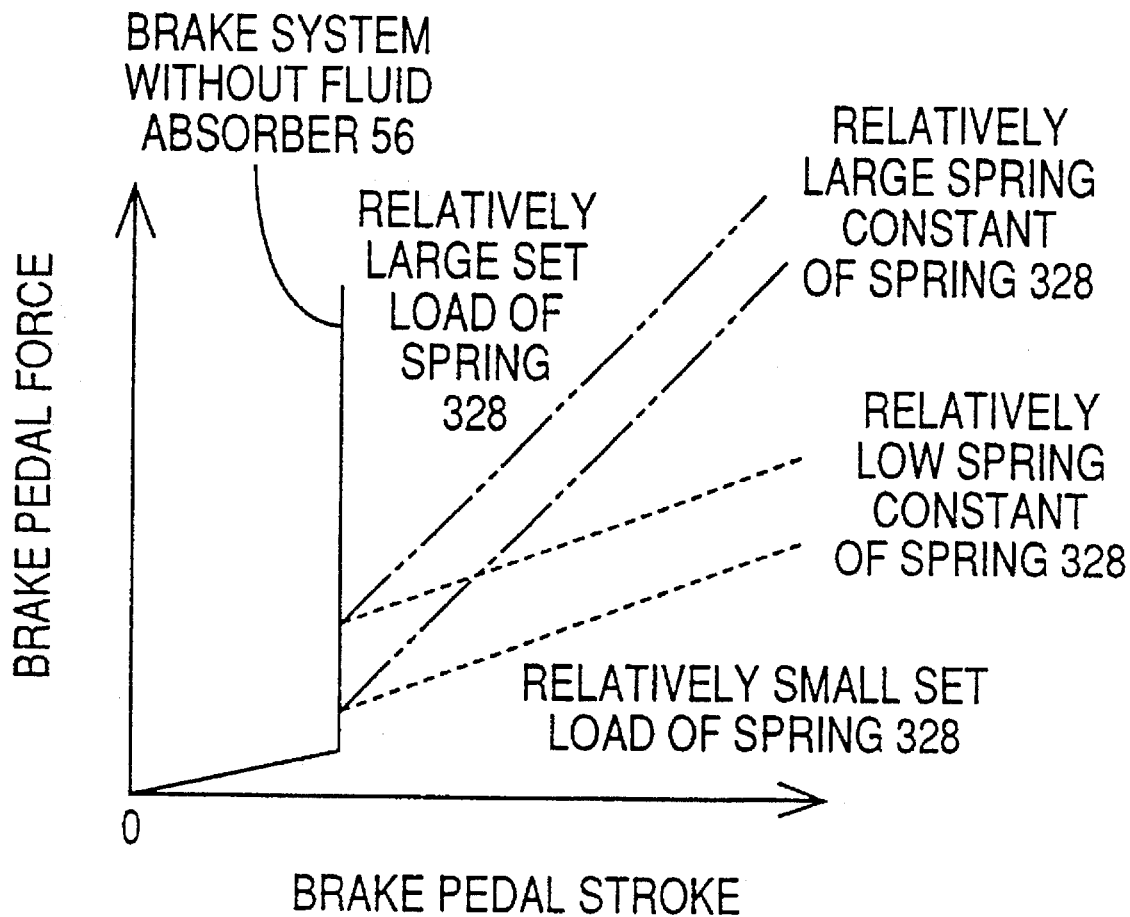
FIG. 21 is a graph indicating a relationship between the brake operating force and a brake pedal operating stroke in the brake system.

The piston 324 of the fluid absorber 56 is advanced as the operating stroke of the brake pedal 10 increases. If the fluid absorber 56 is not provided, the operating stroke of the brake pedal 10 does not increase with an increase in the depression force acting on the brake pedal 10, as indicated in FIG. 21, when the pressure control valve 150 is brought to the second state. Described more particularly, when the valve 150 is operated to the second state, the first and second pressure chambers 181 and 194 are disconnected from each other, preventing the flow of the brake fluid from the master cylinder 12 toward the caliper 16. Vehicle operators usually expect an increase of the operating stroke of the brake pedal 10 as the depression force on the brake pedal increases. Thus, the absence of the fluid absorber 56 causes deterioration of the operating feel of the brake pedal 10 and the controllability of the braking force. In the present brake system equipped with the fluid absorber 56, the disconnection of the first and second pressure chambers 181, 194 of the valve 150 during depression of the brake pedal 10 causes the brake fluid to flow into the fluid absorber 56, and permits an increase of the operating stroke of the brake pedal 10 with an increase in the depression force on the pedal, thereby assuring improved operating feel of the brake pedal 10 and controllability of the braking force.

It will be understood from the graphs of FIGS. 19–21 that the effect of the fluid accumulator 56 to reduce the amount of pressure rise in the second pressure chamber 194 of the valve 150 increases with a decrease in the set load of the spring 328 used in the absorber 56, while the amount of increase in the operating stroke of the brake pedal 10 with an increase in the depression force acting thereon increases with a decrease in the spring constant of the spring 328 (the smaller the spring constant, the softer the operating feel of the brake pedal).

As the depression force on the brake pedal 10 decreases, the master cylinder pressure Pm decreases, and the piston 156 of the pressure control valve 150 is moved toward its fully retracted position, whereby the wheel brake pressure Pw is lowered while maintaining the condition expressed by Pw(Ah–Ar)+F=Pm.Ah, where F represents the biasing force of the spring 236, such as $F_0$, $F_1$, $F_2$ included in the above formulas (1) through (4). When the formula Pm.Ar<$F_0$–f is satisfied, the piston 156 is returned to the fully retracted position.

When the master cylinder pressure Pm is lowered below the present level $Pm_0$, the piston 158 of the shut-off valve 152 is moved in the downward direction (as seen in FIG. 11), whereby the fluid passage 288 is aligned with the by-pass passage 170, that is, the by-pass passage 170 is brought to its open state connecting the second and third ports 162, 164.

As the torque transmitted to the caliper 16 is reduced with a decrease in the wheel brake pressure Pw, the servo pressure Ps in the servo cylinder 78 of the servo pressure generating device 46 is lowered. When a reverse torque transmitted from the drive member 80 to the caliper 16 due to the biasing force of the spring 108 of the servo cylinder 78 exceeds the forward torque transmitted from the rotor 18 to the caliper 16, the second piston 102 is returned under the biasing force of the spring 108 to the fully retracted position in which the piston 102 abuts on the inward flange 112. Further, the drive member 80 is returned to the original position in which the abutting projection 138 is close to the extension 114 of the first piston 100. In the meantime, the caliper 16 and the links 70 are rotated or pivoted in the direction indicated by dashed-line arrow in FIG. 1, and thus returned to their original positions.

When the second piston 102 is returned to its fully retracted position of FIG. 2, the volume of the servo pressure generating chamber 48 is increased. This increase of the volume of the chamber 48 is allowed by either a flow of the brake fluid from the pressure chambers 41, 42 of the wheel brake cylinders 24, 26 into the chamber 48 through either the by-pass passage 170, shut-off valve 152 and check valve 174 if the shut-off valve 152 has been already placed in its open position, or a flow of the brake fluid from the reservoir 165 into the chamber 48 through the fourth port 166 and check valve 178 if the shut-off valve 152 is still closed or if the valve 152 has been partially open but does not permit a sufficient amount of flow of the brake fluid from the wheel brake pressure chambers 41, 42.

Thus, when the depression force acting on the brake pedal 10 is reduced, the shut-off valve 152 is opened, permitting the brake fluid to flow from the wheel brake pressure chambers 41, 42 into the servo pressure generating chamber 48 through the by-pass passage 170. Further, the brake fluid may flow from the reservoir 165 into the chamber 48 as needed. This arrangement assures a fast filling of the chamber 48 with the brake fluid from the wheel brake pressure chambers 41, 42 and/or reservoir 165.

It is noted that the check valve 202 provided in the fluid passage 200 connecting the third pressure cheer 196 and the servo pressure generating chamber 48 inhibits a flow of the fluid from the wheel brake pressure chambers 41, 42 into the chamber 48 through the pressure control valve 150.

As the brake pedal 10 is returned toward the non-operated position, the piston 324 of the fluid absorber 56 is returned toward its fully retracted position, while returning the brake fluid into the master cylinder 12 with a decrease in the master cylinder pressure Pm.

When the vehicle is stopped with the brake pedal 10 kept depressed, that is, when the rotor 18 is at rest while being gripped by and between the pads 32, 34, the pressure in the servo pressure generating chamber 48 is lowered, and may be lower than the atmospheric pressure.

Generally, a vehicle is decelerated and eventually brought to a stop by application of a braking force to the wheels, and a force acts on the vehicle body in a direction opposite to the running direction, immediately after the stopping of the vehicle. During deceleration of the vehicle, elastic members such as those used a suspension system connecting the wheels and the vehicle body undergo elastic deformation due to an inertia of the vehicle body. When this inertia is zeroed upon stopping of the vehicle, the elastic members which have elastically deformed are restored to their original states, causing the vehicle body to be moved relative to the stopped wheels in the direction opposite to the direction in which the vehicle has been running. As a result, the vehicle body is moved beyond the neutral point, causing a torque to act on the wheels in the opposite direction (as indicated by the dashed-line arrow in FIG. 1), whereby the pressure in the servo pressure generating chamber 46 to be lowered. If this torque in the opposite direction is larger than a rolling resistance of the wheel, the wheel is actually rotated in the same opposite direction, causing the caliper 16 and the drive member 80 of the servo pressure generating device 46 to rotate in the same direction. Accordingly, the second piston 102 is moved by the spring 108, causing the pressure in the chamber 48 to be lowered below the atmospheric pressure.

When the vehicle is stopped on an uphill road surface, too, a torque acts on the wheel in the opposite direction, causing a sub-atmospheric pressure in the servo pressure generating chamber 48.

In the above case, the master cylinder pressure Pm remains constant with the brake pedal 10 kept depressed. Therefore, the piston 158 of the shut-off valve 152 is held in the upper position as seen in FIG. 11, and the by-pass passage 170 is held in the closed state.

While the brake pedal 10 is held depressed by a constant force, the pressure control valve 150 remains in the pressure-hold state, without reduction of the wheel brake pressure Pw. In this pressure-hold state, the second pressure chamber 194 is disconnected from both of the first and third pressure chambers 181, 196.

The present embodiment of the invention is adapted to prevent a flow of the brake fluid from the pressure chambers 41, 42 of the wheel brake cylinders 24, 26 into the servo pressure generating chamber 48 through the by-pass passage 170 or pressure control valve 150, and thereby avoid a decrease in the wheel brake pressure Pw, even if the pressure in the chamber 48 is lowered below the atmospheric pressure. Since the by-pass passage 170 is closed, the brake fluid is not allowed to flow from the master cylinder 12 into the servo pressure generating chamber 48. Consequently, the brake pedal 10 is prevented from being moved toward the fully operated position, unexpectedly to the vehicle operator, even when the vehicle is stopped with the brake pedal 10 depressed by a constant force. This arrangement eliminates a discomfort otherwise felt by the vehicle operator due to the unexpected movement of the brake pedal 10. Further, since the pressure in the wheel brake pressure chambers 41, 42 remains unchanged upon stopping of the vehicle, the stopped wheel is braked with a sufficient braking force.

Furthermore, the present brake system uses the check valve 202 in the fluid passage 200 connecting the third port 164 and third pressure chamber 196 of the pressure control valve 150. The check valve 202 prevents a flow of the brake fluid from the third pressure chamber 196 into the servo pressure generating pressure chamber 48 even if the valve 150 is placed in the pressure-hold state connecting the second and third pressure chambers 194, 196, with the piston 156 being advanced upon a further depression of the brake pedal 10 by the vehicle operator while or when the vehicle is stopped. That is, a flow of the brake fluid from the wheel brake pressure chambers 41, 42 into the chamber 48 is prevented in such case. Accordingly, the present brake system does not suffer from an unexpected movement of the brake pedal 10 toward its fully depressed position when the depression force on the brake pedal is increased upon stopping of the vehicle.

The present embodiment is also adapted to prevent vibration or rattling of the servo pressure generating device 46 when the shift lever of the vehicle is operated from a forward drive position to a rear drive position after the vehicle is stopped with the brake pedal 10 held depressed.

Described in detail, when the vehicle is stopped with the brake pedal 10 held in a depressed position if the servo pressure generating chamber 48 is not connected to the reservoir, the servo pressure generating device 46 is in a state in which the first and second pistons 100, 102 are close to each other, namely, in a state similar to the state of FIG. 3. If a drive force acts on the wheel in the rear direction with the shift lever operated from the forward drive position (D) to the rear drive position (R) in the above-indicated state of the device 46, the drive member 80 of the device 46 is pulled in the direction indicated by the dashed-line arrow in FIG. 1. Consequently, if the chamber 48 is not supplied with the brake fluid from the reservoir 165, the first and second pistons 100, 102 are held close to each other. In this condition, the abutting projection 138 may collide with the first piston 110, and generate a noise, and the first and second pistons 110, 102 may move as a unit, resulting in a collision of the second piston 102 with the abutting projection 140, and generating a noise again.

In the present brake system, however, the servo pressure generating chamber 48 is connected to the reservoir 165, so that the chamber 48 is supplied with the brake fluid fed from the reservoir 165 when the pressure in the chamber 48 falls below the atmospheric pressure upon stopping of the vehicle. Consequently, the first and second pistons 100, 102 are returned to the original state of FIG. 2. Thus, the present brake system is adapted so as to substantially eliminate the collision of the abutting projection 138 and the first piston 100 and the noise generation due to the collision even if the drive member 80 is pulled in the direction indicated by the dashed-line arrow in FIG. 1 when the shift lever is operated to the rear drive position (R). Further, since the first and second pistons 100, 102 are held in abutting contact with the inward flanges 110, 112, these pistons 100, 102 are prevented from moving to collide with the abutting projections 138, 140.

There will next be explained operations of the brake system when the depression force acting on the brake pedal 10 is alternately increased and reduced repeatedly during brake application. In this case, the depression force is not reduced below a level at which the shut-off valve 152 is opened.

As the depression force on the brake pedal 10 is increased, the pressure in the pressure chambers 41, 42 of the wheel brake cylinders 24, 26 is increased with a flow of the brake fluid from the servo pressure generating chamber 48 as a result of an operation of the pressure control valve 150. Accordingly, a pull force acting on the drive member 80 of the device 46 is increased, and the distance between the first and second pistons 100, 102 is reduced, whereby the pressure in the chamber 48 is accordingly raised. In other words, the wheel brake pressure Pw and the servo pressure Ps are raised while the volume of the chamber 48 is reduced, as the depression force on the brake pedal 10 is increased.

On the other hand, a decrease in the depression force on the brake pedal 10 causes the brake fluid to flow from the pressure chambers 41, 42 into the master cylinder 12 as a result of an operation of the pressure control valve 150, whereby the wheel brake pressure Pw is lowered, and the pull force acting on the drive member 80 is lowered, to reduce the servo pressure Ps an the servo pressure generating chamber 48. Then, the first and second pistons 100, 102 are moved away from each other under the biasing force of the spring 108, and the pressure in the chamber 48 is lowered below the atmospheric pressure, whereby the brake fluid is supplied from the reservoir 165 into the chamber 48. Thus, the chamber 48 is filled with the fluid before the depression force on the brake pedal 10 is again increased.

If the chamber 48 is not connected to the reservoir 165, no servo pressure Ps may be generated by the servo pressure generating device 46. Although the servo pressure is generated with an increase in the depression force on the brake pedal 10 as in the present brake system, the volume of the chamber 48 is reduced as a result of a flow of the brake fluid into the chambers 41, 42. Even if the depression force is then reduced with a result of a decrease in the pull force acting on the drive member 80, the chamber 48 cannot be supplied with the brake fluid since the shut-off valve 150 remains in the closed position. Therefore, the repeated alternate increase and decrease of the depression force on the brake pedal 10 result in a decrease in the volume of the brake fluid in the chamber 48, and may lead to a failure to generate the servo pressure Ps in proportion to or depending upon the depression force acting on the brake pedal 10.

Then, operations of the present brake system upon depression of the brake pedal 10 during a backward running of the vehicle will be explained. When the vehicle is running in the rear direction, the rotor 18 is rotated in the reverse direction indicated by the dashed-line arrow in FIG. 1. When the brake pedal 10 is depressed by the vehicle operator, therefore, the caliper 16 is rotated in the same reverse direction due to a torque transmitted from the rotor 18 rotating in the same direction. Accordingly, the drive member 80 is moved in the same reverse direction with the caliper 16, whereby the piston 100 is moved toward the second piston 102. Consequently, the volume of the servo pressure generating chamber 48 is reduced, and the servo pressure Ps is generated. FIG. 4 shows the servo pressure generating device. 46 placed in its state for maximum servo pressure Ps upon braking during backward running of the vehicle.

The servo pressure Ps generated upon braking during backward vehicle running is lower than that generated upon braking during forward vehicle running. The maximum distance of movement of the drive member 80 during the forward vehicle running is determined by abutting contact between the first and second pistons 100, 102 before the end face of the arm portion 128 abuts on the end face of the cap 86. On the other hand, the maximum distance of movement of the drive member 80 during the backward vehicle running is determined by abutting contact between the end face 134 of the fixing portion 126 and the end face of the cylindrical member 84. The lengths of the abutting projections 140, 138 are so determined. According to this arrangement, the amount of volume reduction of the chamber 48 upon braking during the backward vehicle running is smaller than that upon braking during the forward vehicle running, and the maximum servo pressure Ps during the backward vehicle running is lower than that during the forward vehicle running. Since the required braking force during the backward vehicle running is generally smaller than that during the forward vehicle running, the maximum servo pressure level Ps is made lower during the backward vehicle running than during the forward vehicle runnings, to assure an optimum braking force depending upon the running direction of the vehicle.

The operations of the pressure control valve 150 and the shut-off valve upon braking during the backward vehicle running are similar to those during the forward vehicle running.

It will be understood from the foregoing description that the present brake system is adapted to prevent the brake pedal 10 from being moved toward its fully depressed position unexpectedly to the vehicle operator, when the vehicle is stopped with the brake pedal 10 kept depressed with a constant force.

It will be also understood that the shut-off valve 152 provided in the by-pass passage 170 which by-passes the pressure control valve 150 assures a normal pressure control function of the pressure control valve 150 while the shut-off valve 152 is in the closed state.

The shut-off valve 152 does not use any sealing member such as a cup seal or O-ring between the piston 158 and the cylinder bore 254, so that the piston 158 has a considerably small sliding resistance and can be moved even when the master cylinder pressure Pm is comparatively low.

The check valve 202 provided to inhibit a flow of the brake fluid into the servo pressure generating chamber 48 prevents an unexpected movement of the brake pedal 10 toward the fully depressed position even when the pressure control valve 150 is brought to the pressure-increase state due to an increase in the depression force acting on the brake pedal 10 when or while the vehicle is stopped.

It is also noted that the fourth port 166 and the check valve 178 permit the brake fluid to be fed from the reservoir 165 into the servo pressure generating chamber 48 when the pressure in the chamber 48 is lowered below the atmospheric pressure. This arrangement is effective to minimize the vibration or rattling of the servo pressure generating device 46 when the shift lever is operated from the forward drive position (D) to the rear drive position (R) while the vehicle is stopped with the brake pedal 20 kept depressed. The reservoir 165 and the check valve 178 is effective to avoid a failure of the device 46 to generate the servo pressure when the depression force on the brake pedal 10 is repeatedly increased and decreased without the depression force being zeroed.

Further, the present brake system using the fluid absorber 56 is capable of reducing the amount of abrupt or sudden rise of the pressure in the second pressure chamber 194 of the pressure control valve 150 when the valve 150 is operated from the first state to the second state. As a result, the abrupt rise of the wheel brake pressure Pw can be suitably restricted, and the controllability of the braking force is accordingly improved.

It is noted, in particular, that the present brake system is free of deterioration of the driving comfort due to abrupt deceleration or braking of the vehicle which would occur due to a sudden rise of the wheel brake pressure Pw upon transition of the pressure control valve 150 from the first state to the second state, since the level $Pm_1$ of the master cylinder pressure Pm at which the valve 150 is operated from the first state to the second state is determined to be relatively low as described above. However, this drawback can be overcome by the provision of the fluid absorber 56. Further, the absorber 56 is effective to avoid a sudden increase of the braking force and therefore an abrupt increase of slipping of the wheel upon operation of the valve 150 to the second state during running of the vehicle on a road surface having a low coefficient of friction.

It is also noted that the fluid absorber 56 permits an increase in the operating stroke of the brake pedal 10 when the depression force on the brake pedal is increased even after the pressure control valve 150 is operated from the first state to the second state. This arrangement assures improved operating feel of the brake pedal 10 and controllability of the braking force.

Further, the set load of the spring 328 of the fluid absorber 56 is easily adjustable. This means that the amount of increase in the pressure in the second pressure chamber 194 of the pressure control valve 150 upon transition to the second state can be easily adjusted.

The check valve 172 provided in the by-pass passage 168 serves to minimize delayed braking during an initial period of depression of the brake pedal 10.

It will be further understood that the connection of the caliper 16 to the steering knuckle 22 by means of the links 70 distant from the axis L of the rotor 18 permits the caliper 16 to be rotated substantially about the axis L, without a change in the attitude of the caliper 16 with respect to the rotor 18, and also permits the caliper 16 to have a relatively large diameter while avoiding an interference with the rotor 18 or wheel disk.

The present brake system uses the single servo pressure generating device 46 which is available not only during the forward vehicle running but also during the backward vehicle running, contrary to a conventional brake system which uses two servo pressure generating devices disposed on the opposite sides of the caliper as viewed in the rotating direction of the rotor 18. Thus, the present disc brake system as a whole is accordingly simplified in construction and reduced in size and cost of manufacture.

In the present embodiment, the shut-off valve 152 is adapted such that the piston 158 is advanced to close the valve 152 when the master cylinder pressure Pm applied to the pressure chamber 274 is raised to the preset level $Pm_0$. However, the wheel brake pressure Pw may be applied to the pressure chamber 274, so that the valve 152 is closed when the wheel brake pressure Pw is raised to a preset level.

The check valve 202 disposed between the pressure control valve 150 and the servo pressure generating device 46 and the reservoir 165 connected to the device 46 through the check valve 178 have the following functions, without the by-pass passage 170, shut-off valve 152 and check valve 174: preventing a movement of the brake pedal 10 toward its fully depressed position when the vehicle is stopped with the brake pedal kept depressed; preventing such movement of the brake pedal 10 when the depression force on the brake pedal is increased while the vehicle is stopped; and feeding the brake fluid into the servo pressure generating chamber 48 when the volume of the chamber 48 is reduced.

Figure 22:
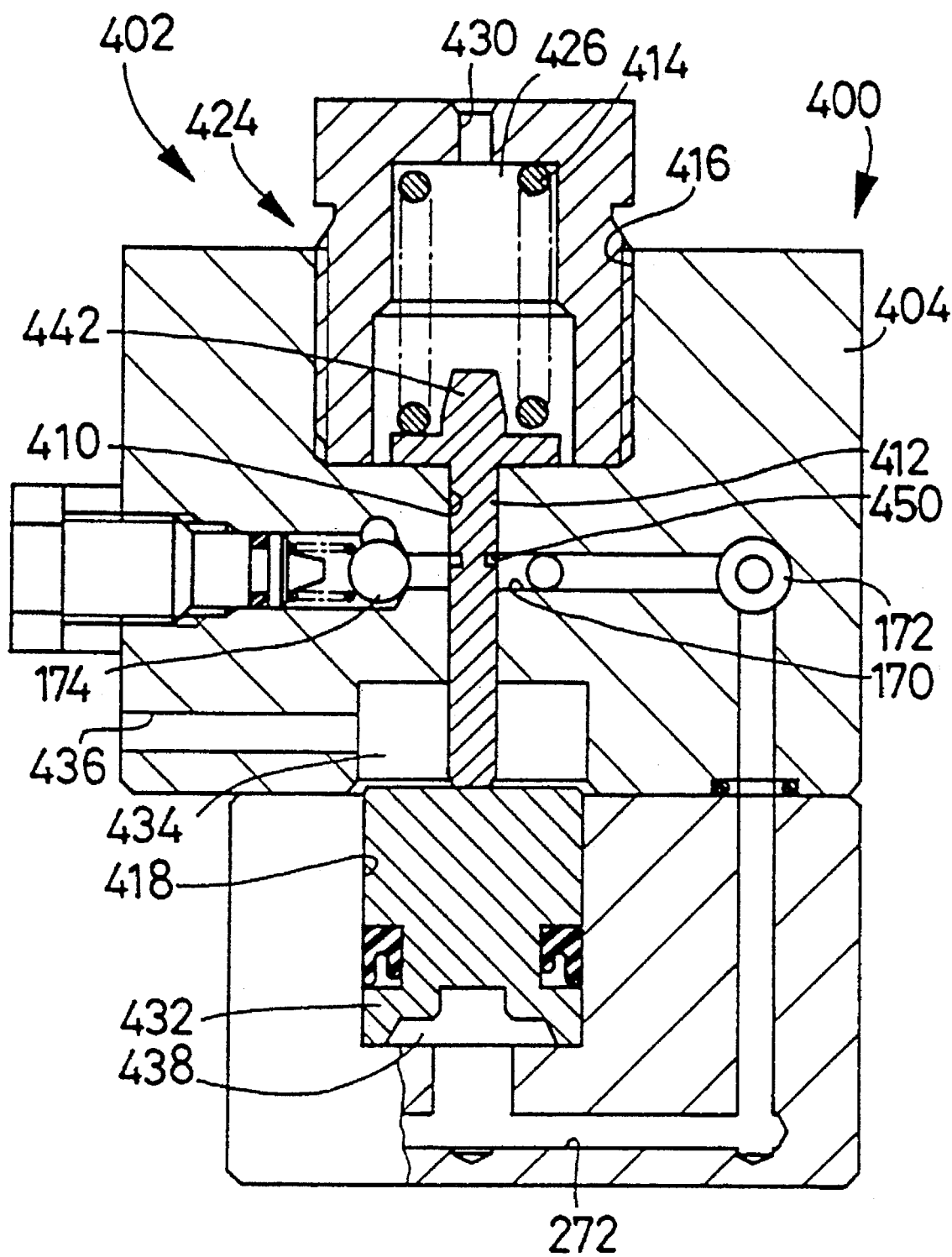
FIG. 22 is a front elevational view in cross section of a pressure control valve used in a brake system constructed according to a second embodiment of this invention.

Referring to FIG. 22, there will be described a second embodiment of the present invention which uses a pressure control device 400 in place of the pressure control device 44 and which does not require the fluid absorber 56 and is simplified in construction. In FIG. 22, the same reference numerals as used in FIGS. 9–11 will be used to identify the functionally corresponding elements. The control valve 400 incorporates a shut-off valve 402 in place of the shut-off valve 152.

The shut-off valve 402 has a cylinder bore 410 formed in a housing 404. Within the cylinder bore 410, there is fluid-tightly and slidably received a piston 412, which is biased by a spring 414.

The cylinder bore 410 communicates at one end with a tapped hole 416 and at the other end with another cylinder bore 418. The tapped hole 416 is closed by an externally threaded plug 424, which has a atmospheric pressure chamber 426 formed therein. This chamber 426 is open to the atmosphere through a through-hole 430 formed in the plug 424.

A piston 432 is received fluid-tightly and slidably in the cylinder bore 418. An end portion of the cylinder bore 418 communicating with the cylinder bore 410 cooperates with the corresponding end face of the piston 432 to define an atmospheric pressure chamber 434, which is open to the atmosphere through a fluid passage 436. The other end portion of the cylinder bore 418 cooperates with the corresponding end face of the piston 432 to define a pressure chamber 438, which communicates with the master cylinder 12 through the fluid passage 272.

The piston 412 has a head portion 442 disposed in the atmospheric pressure chamber 426, and an end portion remote from the head portion 442, which extends into the atmospheric pressure chamber 434 and is abuttable on the piston 436.

The spring 414 indicated above id interposed between the head portion 442 of the piston 412 and the plug 424. A set load or initial biasing force of the spring 414 is determined in relation to the pressure-receiving area (cross sectional area) of the piston 432.

The piston 412 has, at a middle portion thereof, an annular groove 450 serving as a fluid passage. When the piston 412 is placed in its original position, the fluid passage 450 is aligned with the by-pass passage 170.

In the shut-off valve 402 constructed as described above, the piston 412 is in the original position while a force produced by the master cylinder pressure Pm is smaller than the set load of the spring 414. In the original position, the head portion 442 is held in abutting contact with the bottom wall surface of the tapped hole 416, and the piston 432 is placed in its fully retracted position. In this condition, the fluid passage 450 is aligned with the by-pass passage 170, that is, the by-pass passage 170 is open.

When the force produced by the master cylinder pressure Pm exceeds the set load of the spring 414, the shut-off valve 402 is brought to its closed position. Described in detail, the piston 432 is moved against the biasing force of the spring 414, and the piston 410 is accordingly moved toward the atmospheric pressure chamber 426, whereby the fluid passage 450 becomes out of alignment with the by-pass passage 170, and the by-pass passage 170 is thus cut by the piston 412 and placed in the closed state.

Therefore, the shut-off valve 402 inhibits a flow of the brake fluid from the wheel brake pressure chambers 41, 42 into the servo pressure generating chamber 48 and a consequent shortage of the braking force, and prevents an unexpected and undesirable movement of the brake pedal 10 toward its fully depressed position, when the vehicle is stopped with the brake pedal 10 kept depressed.

In the present embodiment, the piston 432 has started a movement toward the atmospheric pressure chamber 434 when the pressure control piston 150 is operated from the first state to the second state. Therefore, the pistons 432 and 412 are moved upward as seen in FIG. 22 as the pressure in the pressure chamber 438 increases, whereby a portion of the brake fluid in the master cylinder 12 is absorbed by the pressure chamber 438. Thus, the present arrangement reduces the amount of abrupt rise of the master cylinder pressure Pm and the wheel brake pressure Pw when the pressure control valve 150 is brought to its second state.

Further, the pistons 432 and 412 are moved upward as the depression force on the brake pedal 10 increases, even after the second pressure chamber 194 is disconnected from the first pressure chamber 181 with the valve 150 placed in the second state. Accordingly, the operating stroke of the brake pedal 10 is increased as the depression force on the brake pedal 10 increases. This arrangement assures good operating feel of the brake pedal 10 and improved controllability of the braking force.

Figure 23:
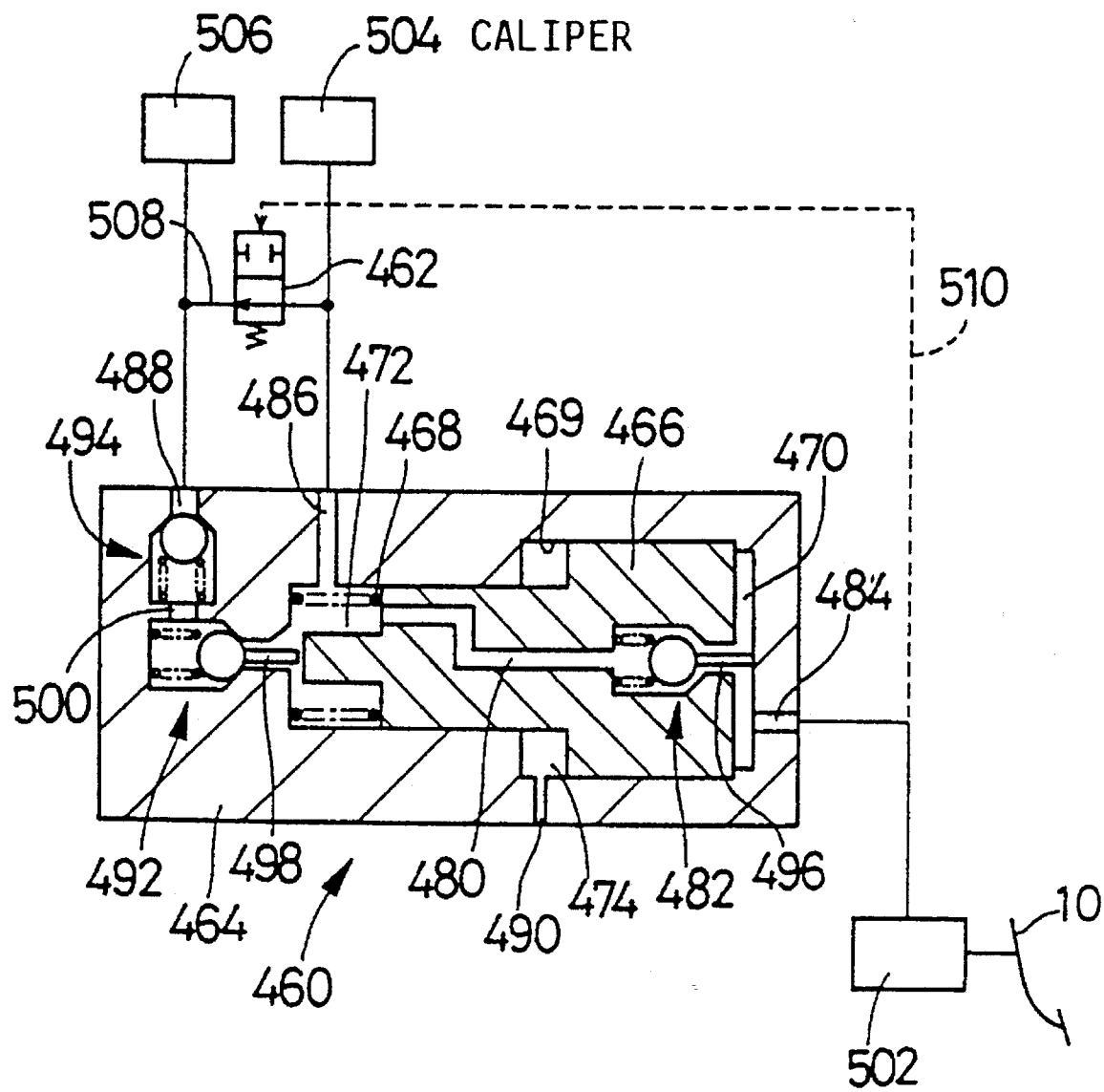
FIG. 23 is a schematic view showing a brake system according to a third embodiment of the invention.

Referring next to FIG. 23, there will be described a third embodiment of this invention in which the pressure control device incorporates a pressure control valve 460 and a pilot-operated shut-off valve 462.

The pressure control valve 460 has a housing 464, a valve piston 466 and biasing means in the form of a spring 468. The valve piston 466 is a stepped piston including a large-diameter portion and a small-diameter portion, and is received in a stepped cylinder bore 469 formed in the housing 464. The valve piston 466 cooperates with the cylinder bore 469 to define a first pressure chamber 470, a second pressure chamber 472 and an atmospheric pressure chamber 474.

The valve piston 466 has a fluid passage 480 formed therethrough in its axial direction. A shut-off valve 482 is provided in the fluid passage 480. The housing 464 has a first port 484, a second port 486, a third port 488, and a through-hole 490. A shut-off valve 492 and a check valve 494 are provided in series at the third port 488.

The shut-off valve 482 consists of a check valve permitting a flow of the fluid in the direction from the first pressure chamber 470 toward the fluid passage 480, and a valve opening projection 496 extending from a ball of the check valve. The shut-off valve 482 is opened when the valve piston 466 is placed in its fully retracted position on the side of the first pressure chamber 470. The shut-off valve 492 consists of a check valve permitting a flow of the fluid in the direction from the second pressure chamber 472 toward the third port 488, and a valve opening projection 498 extending from a ball of the check valve. The shut-off valve 492 is opened when the valve piston 466 is placed in its fully advanced position on the side of the second pressure chamber 472. The check valve 494 permits a flow of the fluid in the direction opposite to that of the shut-off valve 492.

The third pressure chamber 500 is formed between the shut-off valve 492 and the check valve 494.

A master cylinder 502, a caliper 504 and a servo pressure generating device 406 are connected to the first, second and third ports 484, 486 and 488, respectively. The shut-off valve 462 is provided in a by-pass passage 508 which connects the second and third pressure chambers 472, 500 while by-passing the pressure control valve 460. The shut-off valve 462 is connected to the master cylinder 502 through a pilot passage 510, and is closed when the master cylinder pressure exceeds a predetermined level.

Like the pressure control valve 150 used in the preceding embodiments, the pressure control valve 460 is adapted to control the pressure in the second pressure chamber 472 by selective mutual connection and disconnection of the first, second and third pressure chambers 470, 472, 474 depending upon a movement of the valve piston 466, such that the pressure in the second pressure chamber 472 is higher than and proportional to the pressure in the first pressure chamber 470. However, the pressure control valve 460 is different from the pressure control valve 150 in that the brake fluid may flow from the master cylinder 502 toward the servo pressure generating device 506, in the absence of the check valve 470.

While the servo pressure generating device 506 may be smoothly supplied with the brake fluid, the brake pedal 10 suffers from an unexpected movement toward its fully retracted position when the pressure in the servo pressure generating device 506 is lower than the pressure in the caliper 504 or master cylinder 502. To avoid this drawback, the present third embodiment uses the check valve 494, which inhibits a flow of the brake fluid from the caliper 504 toward the servo pressure generating device 506 when the pressure in the device 506 is lower than that in the caliper 504.

Referring to FIGS. 24–27, there will be described a fourth embodiment of the present invention, which uses a pressure control device 544 in place of the pressure control device 44 of FIG. 9. The pressure control device 544 incorporates a pressure control valve 672 in place of the pressure control valve 150.

Figure 24:
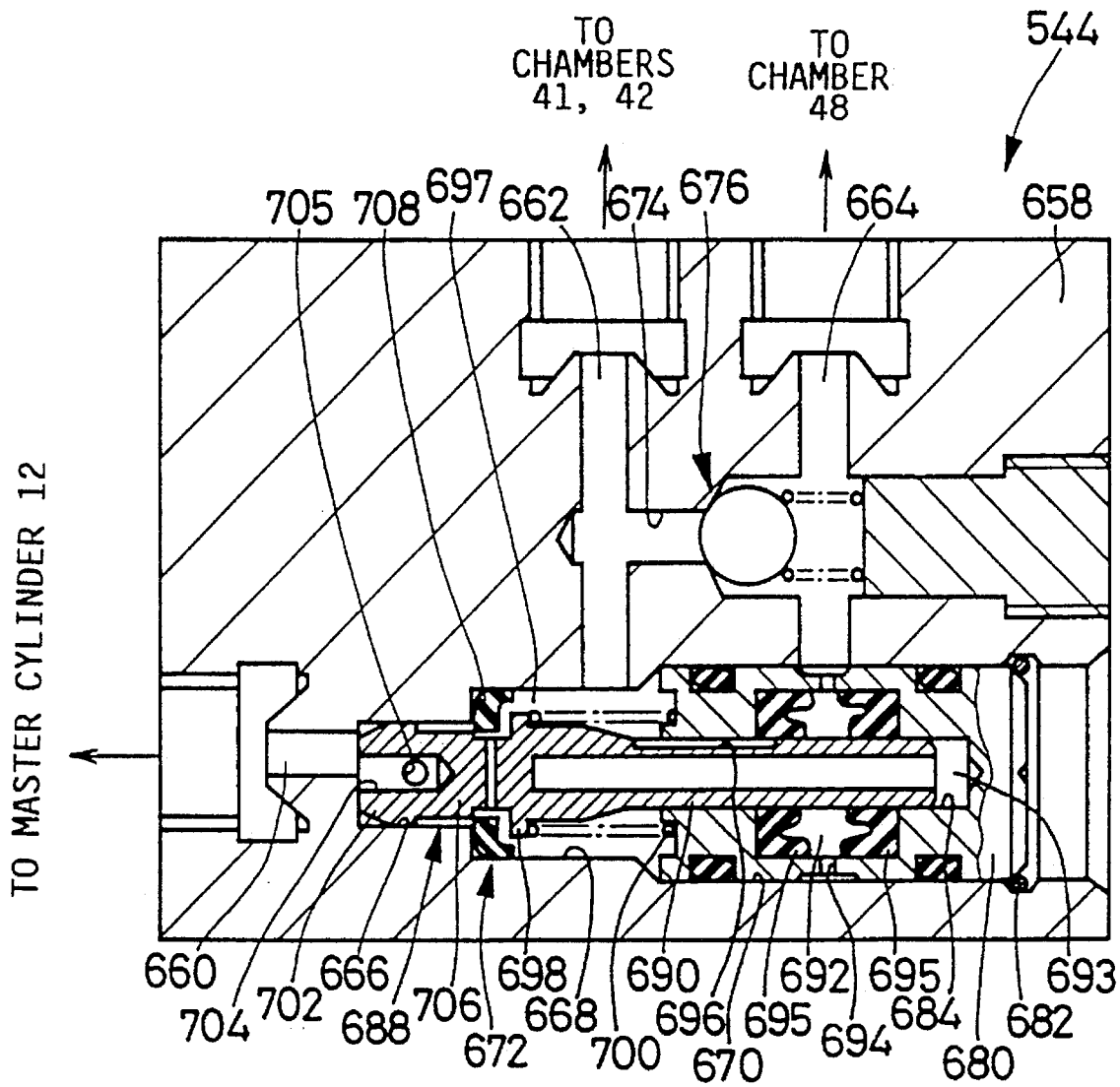
FIG. 24 is a front elevational view in cross section of a pressure control valve used in a brake system according to a fourth embodiment of the invention.

As shown in FIG. 24, the pressure control device 544 uses a valve housing 658 which has a first port 660 communicating with the master cylinder 12, a second port 662 communicating with the pressure chambers 41, 42 of the wheel brake cylinders 24, 26 of the caliper 16, and a third port 664 communicating with the port 107 of the servo cylinder 78 of the servo pressure generating device 46. The valve housing 658 also has a stepped valve hole consisting of a small-diameter portion 666, a medium-diameter portion 668 and a large-diameter portion 670. The first, second and third ports 660, 662 and 664 communicate with the small-diameter, medium-diameter and large-diameter portions 666, 668 and 670, respectively. The small-diameter portion 666 functions as a first pressure chamber whose pressure is equal to the master cylinder pressure Pm.

The second and third ports 662, 664 communicate with each other by a fluid passage 674 in which a check valve 676 is provided. The check valve 676 permits a flow of the brake fluid in a direction from the wheel brake cylinders 24, 26 of the caliper 16 toward the servo pressure generating chamber 48, but inhibits a flow of the fluid in the opposite direction.

Within the large-diameter portion 670, there is fluid-tightly disposed an auxiliary housing 680 such that the housing 680 is fixed in position by a retainer ring 682. The auxiliary housing 680 has a stepped axial hole 684 which is open at one end thereto. The axial hole 684 slidably receives a shaft portion 690 of a valve piston 688, whereby a third pressure chamber 692 and an air chamber 693 are formed. The third pressure chamber 692 communicates with the servo pressure generating chamber 48 through a fluid passage 694 and the third port 664. The shaft portion 690 of the valve piston 688 has a center bore communicating with the air chamber 693. This center bore is considered to be a part of the air chamber 693. Two cup seals 695 are disposed within the third pressure chamber 692, to provide fluid tightness between the shaft portion 690 and the auxiliary housing 680. The shaft portion 690 has an axial groove 696 formed in its outer circumferential surface so as to extend in the axial direction. When the valve piston 688 is placed in its original position of FIG. 24, the axial groove 686 does not connect the third pressure chamber 692 and a second pressure chamber 697 which communicates with the medium-diameter portion 668 of the second port 662. In this position, the servo pressure generating chamber 48 is disconnected from the wheel brake cylinders 24, 26.

In the second pressure chamber 697, a spring 700 is disposed between a flange portion 698 of the valve piston 688 and the auxiliary housing 680, to bias the valve piston 688 in a direction away from the auxiliary housing 680, that is, in the left direction as seen in FIG. 24. The original position of the valve piston 688 is determined by abutting contact of a head portion 702 thereof with an end face of the small-diameter portion 666 of the valve hole 672. The head portion 702 has fluid passages 704, 705 formed therethrough. When the valve piston 688 is placed in its original position, the fluid passages 704, 705 communicate with the first and second ports 660, 662. A sleeve member 708 is disposed in contact with a shoulder face of the second pressure chamber 697. When the valve piston 688 is advanced by a predetermined distance, a spool portion 706 of the head portion 702 fluid-tightly engages a hole in the sleeve member 708, for thereby disconnecting the first and second ports 760 and 762. The spool portion 706 may further move through the sleeve member 708, so that second and third pressure chambers 697, 692 are connected by the axial groove 696 of the shaft portion 690, while the wheel brake cylinders 24, 26 are connected to the servo pressure generating chamber 48 by the axial groove 696.

Figure 25:
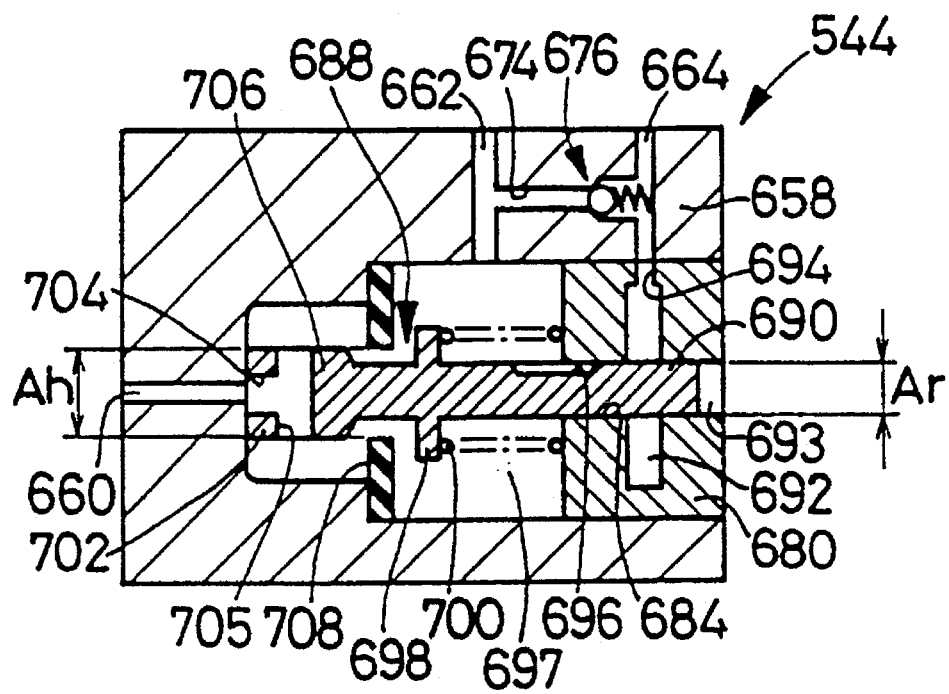
FIGS. 25, 26 and 27 are views corresponding to FIGS. 15–17, the pressure control valve placed in three different positions, respectively.

Before the brake pedal 10 is depressed, the valve piston 688 of the pressure control valve 672 of the pressure control device 544 is held in its original position (fully retracted position) under the biasing force of the spring 700, as shown in FIG. 25. In this position, the pressure control valve 672 is placed in the first state in which the wheel brake cylinders 24, 26 of the caliper 16 communicate with the master cylinder 12.

Figure 26:
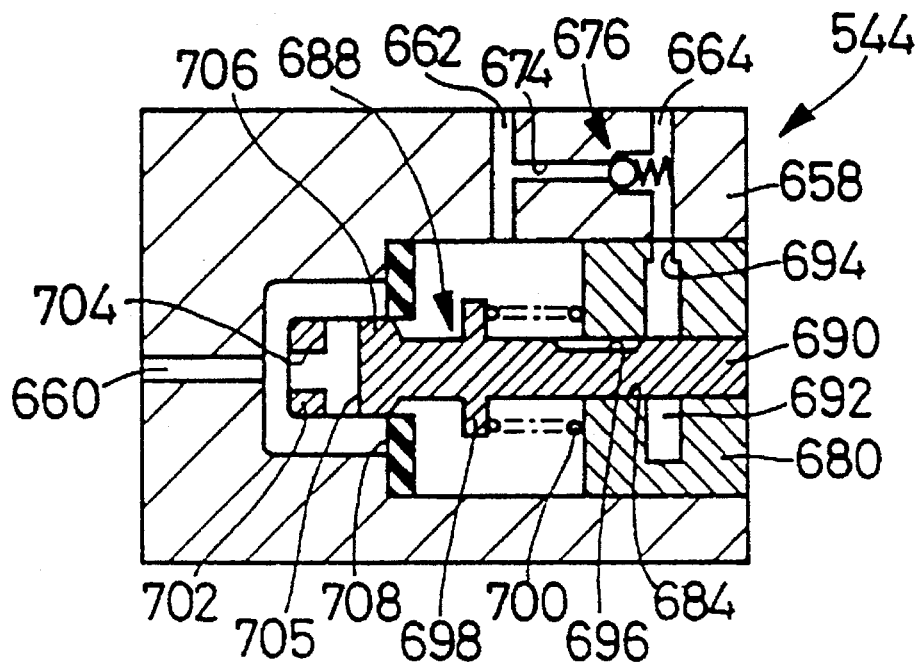

With the brake pedal 12 depressed, the valve piston 688 is advanced against the biasing force of the spring 700. When the spool portion 706 of the valve piston 688 begins fluid-tight engagement with the sleeve member 608 as shown in FIG. 26, the first and second ports 660 and 662 are disconnected from each other. That is, the pressure control valve 672 is placed in the closed state in which neither the master cylinder pressure Pm nor the servo pressure Ps is applied to the wheel brake cylinders 24, 26.

Figure 27:
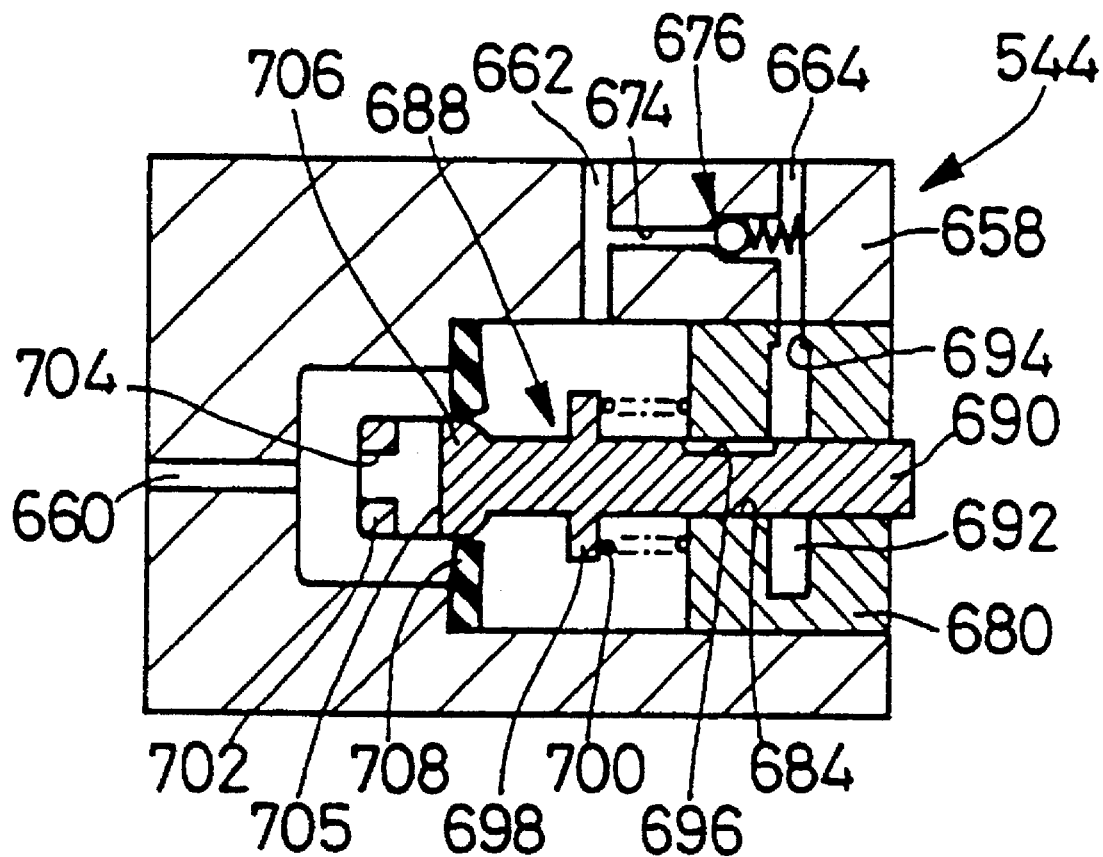

With an increase in the depressing force on the brake pedal 12, the valve piston 688 is further advanced as shown in FIG. 27, and the pressure control valve 672 is placed in the second state in which the second and third pressure chambers 697, 692 are connected to each other by the axial groove 696, while the second and third ports 692, 694 communicate with each other. Accordingly, the servo pressure Ps is applied from the third port 694 to the cylinders 24, 26 of the caliper 16 through the third pressure chamber 692 and second port 662, whereby the braking force is increased.

In the present fourth embodiment, too, the fluid absorber 56 is effective to reduce the amount of abrupt rise of the master cylinder pressure Pm which takes place due to a flow of the brake fluid from the first pressure chamber 666 into the fluid passage 50 upon a retracting movement of the valve piston 688 when the pressure control valve 672 is operated from the first state to the second state. Accordingly, the amount of abrupt rise of the wheel brake pressure Pw is also reduced.

The fluid absorber 56 is also effective to permit the operating stroke of the brake pedal 10 to increase with an increase in the depression force acting thereon, even if the first and second pressure chambers 666, 697 are disconnected from each other when the pressure control valve 672 is operated to the second state.

Figure 28:
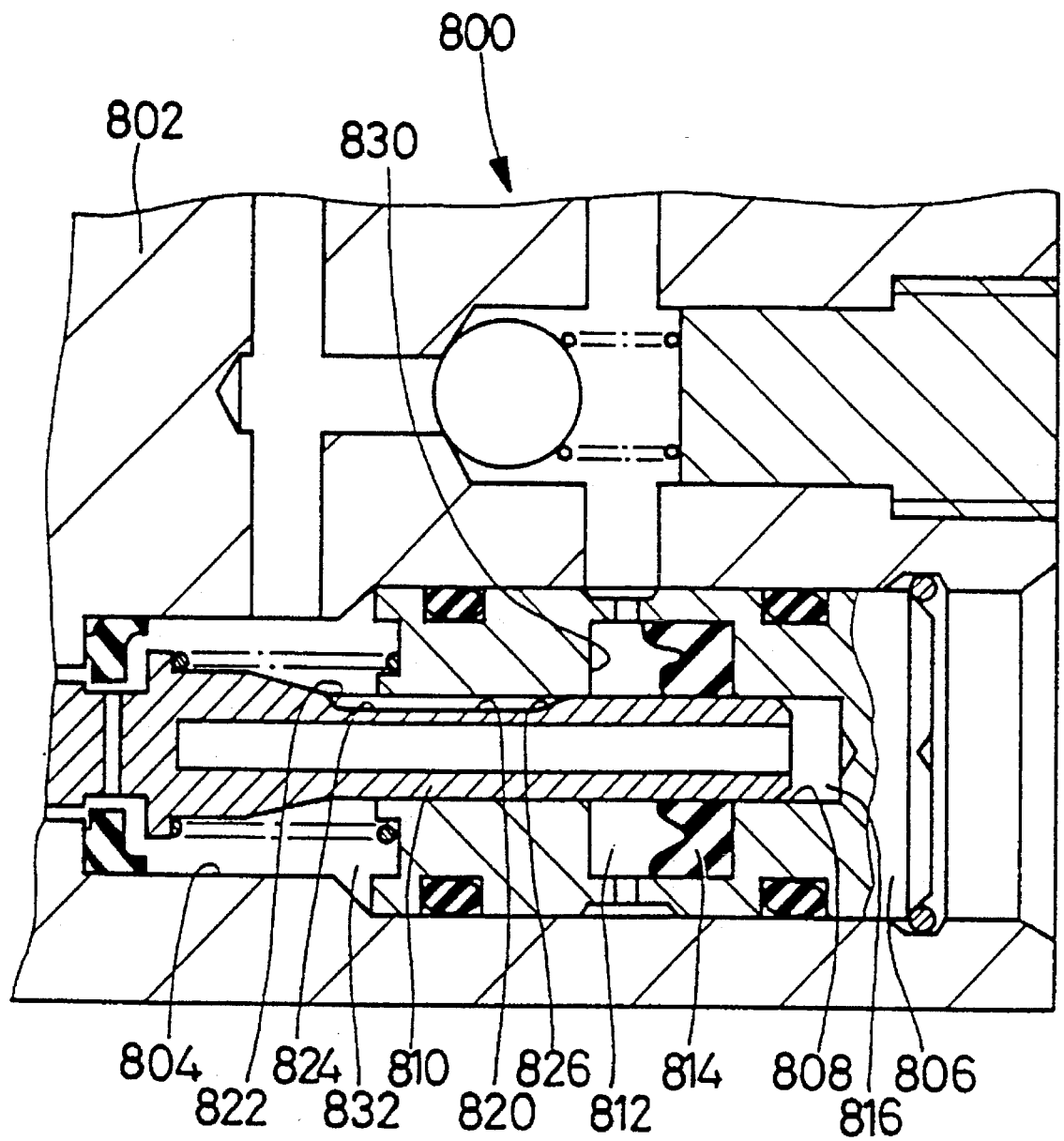
FIG. 28 is an elevational view in cross section of a pressure control valve used in a brake system according to a fifth embodiment of the invention.

Reference is now made to FIG. 28, which shows a pressure control valve 800 used in a fifth embodiment of the present invention, in place of the pressure control valve 675 used in the fourth embodiment described above.

The pressure control valve 800 uses a housing 802 in which is formed a stepped cylinder bore 804. An auxiliary housing 806 is received in the cylinder bore 804. In an intermediate portion of the auxiliary housing 806, there is formed a bore 808 which has a large-diameter portion and a small-diameter portion. A shaft portion of a valve piston 810 slidably engages the bore 808. The valve piston 810 cooperates with the large-diameter portion of the bore 808 to define a pressure chamber 812 which communicates with the servo pressure generating chamber 48. The auxiliary housing 806 and the valve piston 810 cooperate to define an air chamber 816 which is fluid-tightly disconnected from the pressure chamber 812 a the cup seal 814 disposed in the pressure chamber 812.

The valve piston 810 has a communication passage 820 formed in an outer circumferential surface thereof. The communication passage 820 has a bottom surface 824 whose length is defined by a rear end face 822 and a front end face 826. The rear end face 822 is inclined with respect to the bottom surface 824, but is almost perpendicular to the bottom surface 824. On the other hand, the front end face 826 is inclined at about 45 degrees with respect to the bottom surface 824. The communication passage 820 is shaped and dimensioned such that the cross sectional area taken in a plane perpendicular to the axial direction of the piston 810 and to the plane of FIG. 28 gradually increases in the direction from the front end face 826 toward the rear end face 824. In this specific example, the communication hole 820 has a generally rectangular shape at a rear end portion on the side of the rear end face 824, and a generally triangular shape at a front end portion on the side of the front end face 826, as seen in a plan view taken from the top toward the bottom of FIG. 28.

As the piston 810 is advanced, the front end face 926 of the passage 820 is located in front of an end face 830 of the auxiliary housing 806, and the passage 820 communicates with the pressure chamber 812. Since the passage 820 has the cross sectional area increasing in the forward direction as explained above, the area of fluid communication between the passage 820 and the pressure chamber 812 gradually increases as the piston 810 is advanced. This arrangement is effective to prevent a rapid flow of the brake fluid from the pressure chamber 812 as the third pressure chamber into the pressure chamber 832 as the second pressure chamber. Thus, the present embodiment is adapted to reduce the amount of abrupt rise of the pressure in the second pressure chamber 832.

The communication passage 820 may be modified as needed, provided that the area of fluid communication with the pressure chamber 812 gradually increases as the piston 810 is advanced. For instance, the area of fluid communication between the passage 820 and the chamber 812 may increase in steps, rather than continuously.

While the present invention has been described in detail in its presently preferred embodiments with a certain degree of particularity, it is to be understood that the invention is not limited to the details of the illustrated embodiments, but may be otherwise embodied.

It will be understood that the principle of the present invention is applicable to not only an opposed-cylinder type disc brake but also to a floating-caliper type disc brake in which at least one cylinder is disposed on only one side of the disc rotor and the caliper is supported by a mounting bracket movably in the axial direction of the rotor. In the floating-caliper type disc brake, the mounting bracket which supports brake pads is attached to a stationary member through at least two links, for example, so that the mounting bracket receives a torque from the caliper and is rotated about the axis of the disc rotor upon brake application to the rotor through the pads.

The position and number of the links may be suitably determined depending upon the configuration and size of the brake device including the caliper and mounting bracket.

In the illustrated embodiments, the servo pressure generating device 46, 506 is connected to the links 70, the device 46 may be connected to the caliper 16 or pin 75.

In the illustrated embodiments, the servo pressure generating device is disposed relative to the caliper so that the drive member 80 is pulled by the caliper in the forward rotating direction of the rotor 18 (indicated by the solid-line arrow in FIG. 1) when the caliper is activated during forward running of the vehicle, and pushed by the caliper in the backward rotating direction of the rotor (indicated by the dashed-line arrow in FIG. 1) when the caliper is activated during backward running of the vehicle. However, the servo pressure generating device may be positioned relative to the caliper so that the drive member is pushed and pulled during the forward and backward runnings of the vehicle, respectively.

While the drive member 80 of the servo pressure generating device is generally U-shaped, the drive member 80 may have an annular or other shape, provided that the drive member has an integrally formed pair of opposed operating portions which act on the first and second pistons 100, 102.

Although the pressure control valve 150, shut-off valve 152, and check valves 178, 202 in the first embodiment are provided in the same housing 154, these valves may be provided or formed in respective separate housing members, or two or more of the valves are provided in one housing member.

While the pressure control device 44, 400, 544 is used for applying the master cylinder Pm or servo pressure Ps to both of the front and rear calipers 16, 17 for the front and rear wheels, the master cylinder pressure Pm may be applied directly to one of the front and rear calipers. In this case, the operating stroke of the brake pedal 10 increases with an increase in the depression force, even after the pressure control valve is operated to the second state.

It is noted that an unexpected movement of the brake pedal 10 toward its fully depressed position during stopping of the vehicle may be avoided if the depression force on the brake pedal 10 is kept constant by the vehicle operator when the vehicle is stopped. In this sense, the check valve 202, reservoir 165 and check valve 178 provided in the first embodiment are not essential, for example.

It is to be understood that the present invention may be embodied with various other changes, modifications and improvements, which may occur to those skilled in the art, without departing from the spirit and scope of the invention defined in the following claims.

What is claimed is:

1. A hydraulically operated brake system comprising:

an operator-controlled brake operating member;

an operator-controlled pressure generating device for generating a pressure of a brake fluid depending upon an operation of said brake operating member;

a braking device having a brake pad, a pad support member supporting said brake pad, and a brake cylinder operated by a pressure of the brake fluid to force said brake pad against a disc rotor, said braking device being attached to a stationary member near said disc rotor, rotatably in a rotating direction of the disc rotor;

a servo pressure generating device activated by a torque transmitted to said pad support member from said disc rotor during operation of said brake cylinder, to generate a servo pressure of the brake fluid;

a pressure control valve having a first pressure chamber connected to said operator-controlled pressure generating device, a second pressure chamber connected to said braking device and a third pressure chamber connected to said servo pressure generating device, said pressure control valve operating to effect selective connection and disconnection of said first, second and third pressure chambers, for controlling a pressure of the brake fluid in said second pressure chamber such that the pressure in the second pressure chamber is higher than and relating to the pressure in said first pressure chamber;

said pressure control valve inhibiting a flow of the brake fluid from said braking device toward said servo pressure generating device when the pressure in said servo pressure generating device is lower than the pressure in said braking device;

a first by-pass passage for connecting said braking device and said servo pressure generating device while by-passing said pressure control valve; and a shut-off valve provided in said first by-pass passage, said shut-off valve being open when the pressure in said operator-controlled pressure generating device is lower than a predetermined level, and closed when the pressure in said operator-controlled pressure generating device is higher than said predetermined level.

2. A hydraulically operated brake system according to claim 1, wherein said shut-off valve is a pilot-operated shut-off valve which receives as a pilot pressure the pressure in said operator-controlled pressure generating device.

3. A hydraulically operated brake system according to claim 1, wherein said shut-off valve is a pilot-operated shut-off valve which receives as a pilot pressure the pressure in said braking device.

4. A hydraulically operated brake system according to claim 1, further comprising:

a servo pressure passage connecting said servo pressure generating device and said third pressure chamber of said pressure control valve; and a servo pressure passage check valve provided in said servo pressure passage, said servo pressure passage check valve permitting a flow of the brake fluid from said servo pressure generating device toward said third pressure chamber, and inhibiting a flow of the brake fluid from said third pressure chamber toward said servo pressure generating device.

5. A hydraulically operated brake system according to claim 1, further comprising:

a reservoir;

a reservoir passage connecting said reservoir and said servo pressure generating device; and a reservoir passage check valve provided in said reservoir passage, said reservoir passage check valve permitting a flow of the brake fluid from said reservoir toward said servo pressure generating device, and inhibiting a flow of the brake fluid from said servo pressure generating device toward said reservoir.

6. A hydraulically operated brake system according to claim 1, wherein said pressure control valve is normally placed in a first state for connection of said second pressure chamber to said first pressure chamber and for disconnection of said second pressure chamber from said third pressure chamber, for controlling the pressure in said second pressure chamber to be equal to the pressure in said first pressure chamber, said pressure control valve being brought to a second state for disconnection of said second pressure chamber from said first pressure chamber and for connection and disconnection of said second pressure chamber to and from said third pressure chamber, for controlling the pressure in said second pressure chamber to be higher than and relating to the pressure in said first pressure chamber, when the pressure in said first pressure chamber exceeds a predetermined level, said brake system further comprising pressure-rise restricting means for restricting an abrupt rise of the pressure in said second pressure chamber when said pressure control valve is operated from said first state to said second state.

7. A hydraulically operated brake system according to claim 6, wherein said pressure-rise restricting means comprises an accumulator which is connected to a primary fluid passage connecting said operator-controlled pressure generating device and said braking device, said accumulator accommodating the brake fluid under pressure such that the pressure in said accumulator increases with an increase of an amount of the brake fluid accommodated in said accumulator.

8. A hydraulically operated brake system according to claim 7, wherein said accumulator comprises:

a housing;

a piston disposed in said housing and cooperating with said housing to define a fluid absorbing chamber for accommodating the brake fluid;

a spring biasing said piston in a direction of reducing a volume of said fluid absorbing chamber; and a set load adjusting device for adjusting a set load of said spring.

9. A hydraulically operated brake system according to claim 7, wherein said accumulator comprises:

a housing;

a piston disposed in said housing and cooperating with said housing to define a fluid absorbing chamber for accommodating the brake fluid;

a spring biasing said piston in a direction of reducing a volume of said fluid absorbing chamber; and said piston of said accumulator being associated with a valve of said shut-off valve such that said piston of said accumulator acts on said valve of said shut-off valve so as to close said shut-off valve when said piston of said accumulator is moved in said direction of reducing the volume of said fluid absorbing chamber.

10. A hydraulically operated brake system according to claim 1, wherein said pressure control valve comprises a housing, and a control piston disposed in said housing and cooperating with said housing to define said first, second and third pressure chambers, said control piston engaging said housing such that a clearance therebetween is small enough to provide fluid tightness therebetween without a sealing member interposed therebetween.

11. A hydraulically operated brake system according to claim 1, wherein said shut-off valve comprises a housing, and a drive piston which is axially movably received in said housing and which receives as a pilot pressure the pressure in said operator-controlled pressure generating device so as to open and close said shut-off valve, said drive piston engaging said housing such that a clearance therebetween is small enough to provide fluid tightness therebetween without a sealing member interposed therebetween.

12. A hydraulically operated brake system according to claim 1, further comprising a first by-pass passage check valve provided in said first by-pass passage in series with said shut-off valve, said first by-pass passage check valve permitting a flow of the brake fluid from said braking device toward said servo pressure generating device, and inhibiting a flow of the brake fluid from said servo pressure generating device toward said braking device.

13. A hydraulically operated brake system according to claim 1, further comprising:
   a second by-pass passage connected to a primary fluid passage while by-passing said pressure control valve, said primary fluid passage connecting said operator-controlled pressure generating device and said braking device through said pressure control valve; and
   a second by-pass passage check valve provided in said second by-pass passage, said second by-pass passage check valve permitting a flow of the brake fluid from said operator-controlled pressure generating device toward said braking device, and inhibiting a flow of the brake fluid from said braking device toward said operator-controlled pressure generating device.

14. A hydraulically operated brake system according to claim 1, wherein said braking device comprises two links which have a first pair of pivot axes lying on a first circle concentric with said disc rotor, and a second pair of pivot axes lying on a second circle which is concentric with said first circle and which has a larger diameter than said first circle, said two links cooperating with said pad support member and said stationary member to constitute a four-link mechanism, said pad support member being supported by said four-link mechanism such that said pad support member is rotatable substantially about an axis of rotation of said disc rotor.

15. A hydraulically operated brake system according to claim 1, wherein said servo pressure generating device comprises:
   a servo cylinder;
   a servo piston slidably and fluid-tightly engaging said servo cylinder and cooperating with said servo cylinder to define a servo pressure generating chamber;
   a drive member connected to said servo cylinder such that said drive member is movable relative to said servo cylinder in an axial direction of said servo cylinder, said drive member acting on said servo piston to cause a relative movement of said servo cylinder and said servo piston for thereby generating said servo pressure in said servo pressure generating chamber; and
   one of said drive member and said servo cylinder being fixed to said stationary member, and the other of said drive member and said servo cylinder being connected to said braking device.

16. A hydraulically operated brake system according to claim 1, wherein said pressure control valve comprises:
   a control piston having a first pressure-receiving surface receiving the pressure in said first pressure chamber, and a second pressure-receiving surface having a smaller area than said first pressure-receiving surface and receiving the pressure in said second pressure chamber;
   biasing means for biasing said control piston toward said first pressure chamber; and a directional control valve having a first state and a second state, said directional control valve being normally placed in said first state, and brought to said second state when said control piston is moved toward said second pressure chamber against a biasing force of said biasing means, said second pressure chamber being connected to said first pressure chamber and disconnected from said third pressure chamber when said directional control valve is placed in said first state, said second pressure chamber being disconnected from said first pressure chamber and connected to said third pressure chamber when said directional control valve is placed in said second state.

17. A hydraulically operated brake system comprising:
   an operator-controlled brake operating member;
   an operator-controlled pressure generating device for generating a pressure of a brake fluid depending upon an operation of said brake operating member;
   a braking device having a brake pad, a pad support member supporting said brake pad, and a brake cylinder operated by a pressure of the brake fluid to force said brake pad against a disc rotor, said braking device being attached to a stationary member near said disc rotor, rotatably in a rotating direction of the disc rotor;
   a servo pressure generating device activated by a torque transmitted to said pad support member from said disc rotor during operation of said brake cylinder, to generate a servo pressure of the brake fluid;
   a pressure control valve having a first pressure chamber connected to said operator-controlled pressure generating device, a second pressure chamber connected to said braking device and a third pressure chamber connected to said servo pressure generating device, said pressure control valve operating to effect selective connection and disconnection of said first, second and third pressure chambers, for controlling a pressure of the brake fluid in said second pressure chamber such that the pressure in the second pressure chamber is higher than and relating to the pressure in said first pressure chamber;
   said pressure control valve inhibiting a flow of the brake fluid from said braking device toward said servo pressure generating device when the pressure in said servo pressure generating device is lower than the pressure in said braking device;
   a servo pressure passage connecting said servo pressure generating device and said third pressure chamber of said pressure control valve;
   a servo pressure passage check valve provided in said servo pressure passage, said servo pressure passage check valve permitting a flow of the brake fluid from said servo pressure generating device toward said third pressure chamber, and inhibiting a flow of the brake fluid from said third pressure chamber toward said servo pressure generating device;
   a reservoir;
   a reservoir passage connecting said reservoir and said servo pressure generating device; and
   a reservoir passage check valve provided in said reservoir passage, said reservoir passage check valve permitting a flow of the brake fluid from said reservoir toward said servo pressure generating device, and inhibiting a flow of the brake fluid from said servo pressure generating device toward said reservoir.

18. A hydraulically operated brake system comprising:

an operator-controlled brake operating member;

an operator-controlled pressure generating device for generating a pressure of a brake fluid depending upon an operation of said brake operating member;

a braking device having a brake pad, a pad support member supporting said brake pad, and a brake cylinder operated by a pressure of the brake fluid to force said brake pad against a disc rotor, said braking device being attached to a stationary member near said disc rotor, rotatably in a rotating direction of the disc rotor;

a servo pressure generating device activated by a torque transmitted to said pad support member from said disc rotor during operation of said brake cylinder, to generate a servo pressure of the brake fluid;

a pressure control valve having a first pressure chamber connected to said operator-controlled pressure generating device, a second pressure chamber connected to said braking device and a third pressure chamber connected to said servo pressure generating device, said pressure control valve operating to effect selective connection and disconnection of said first, second and third pressure chambers, for controlling pressure of the brake fluid in said second pressure chamber such that the pressure in the second pressure chamber is higher than and relating to the pressure in said first pressure chamber;

a reservoir for storing the brake fluid under a pressure substantially equal to an atmospheric pressure;

a reservoir passage connecting said reservoir and said servo pressure generating device; and a reservoir passage check valve provided in said reservoir passage, said reservoir passage check valve permitting a flow of the brake fluid from said reservoir toward said servo pressure generating device, and inhibiting a flow of the brake fluid from said servo pressure generating device toward said reservoir.

19. A hydraulically operated brake system for a vehicle having a wheel and a disc rotor rotating with the wheel, comprising:

an operator-controlled brake operating member;

an operator-controlled pressure generating device for generating a pressure of a brake fluid depending upon an operation of said brake operating member;

a wheel brake cylinder for braking the disc rotor;

a high-pressure source for applying to said wheel brake cylinder a pressure higher than the pressure generated by said operator-controlled pressure generating device;

a pressure control valve having a first pressure chamber connected to said operator-controlled pressure generating device, a second pressure chamber connected to said braking device and a third pressure chamber connected to said high-pressure source, said pressure control valve being normally placed in a first state for connection of said second pressure chamber to said first pressure chamber and for disconnection of said second pressure chamber from said third pressure chamber, for controlling the pressure in said second pressure chamber to be equal to the pressure in said first pressure chamber, said pressure control valve being brought to a second state for disconnection of said second pressure chamber from said first pressure chamber and for connection and disconnection of said second pressure chamber to and from said third pressure chamber, for controlling the pressure in said second pressure chamber to be higher than and relating to the pressure in said first pressure chamber, when the pressure in said first pressure chamber exceeds a predetermined level; and pressure-rise restricting means for restricting an abrupt rise of the pressure in said first pressure chamber just after said pressure control valve is operated from said first state to said second state.

20. A hydraulically operated brake system according to claim 19, wherein said pressure-rise restricting means comprises an accumulator which is connected to a primary fluid passage connecting said operator-controlled pressure generating device and said wheel brake cylinder, said accumulator accommodating the brake fluid under pressure such that the pressure in said accumulator increases with an increase of an amount of the brake fluid accommodated in said accumulator.

* * * * *